(12) United States Patent
Limone et al.

(10) Patent No.: US 11,103,994 B2
(45) Date of Patent: Aug. 31, 2021

(54) SYSTEM AND METHOD FOR NATURAL TASKING OF ONE OR MORE ROBOTS

(71) Applicant: Teradyne, Inc., North Reading, MA (US)

(72) Inventors: Brett L. Limone, Malden, MA (US); Justin C. Keesling, Vail, AZ (US); Chalongrath Pholsiri, Round Rock, TX (US); James D. English, Alva, FL (US); Chu-Yin Chang, Plano, TX (US)

(73) Assignee: Teradyne, Inc., North Reading, MA (US)

( * ) Notice: Subject to any disclaimer, the term of this patent is extended or adjusted under 35 U.S.C. 154(b) by 277 days.

(21) Appl. No.: 16/025,544

(22) Filed: Jul. 2, 2018

(65) Prior Publication Data
US 2020/0001457 A1    Jan. 2, 2020

(51) Int. Cl.
*B25J 9/16* (2006.01)
*B25J 9/00* (2006.01)

(52) U.S. Cl.
CPC .......... *B25J 9/1653* (2013.01); *B25J 9/0084* (2013.01); *B25J 9/1666* (2013.01); *B25J 9/1697* (2013.01)

(58) Field of Classification Search
CPC ...... B25J 9/1653; B25J 9/0084; B25J 9/1666; B25J 9/1697; B25J 9/1661
See application file for complete search history.

(56) References Cited

U.S. PATENT DOCUMENTS

| | | | | |
|---|---|---|---|---|
| 6,004,016 A * | 12/1999 | Spector | ............... | B25J 9/1666 700/247 |
| 6,157,368 A * | 12/2000 | Fager | ................ | B25J 9/1656 250/221 |
| 6,274,839 B1 * | 8/2001 | Stone | ................ | B23K 9/04 219/125.1 |
| 6,385,508 B1 * | 5/2002 | McGee | ................ | B25J 9/0081 285/189 |
| 6,757,587 B1 | 6/2004 | English et al. | | |
| 7,016,539 B1 * | 3/2006 | Silver | ................ | G06K 9/481 382/216 |

(Continued)

FOREIGN PATENT DOCUMENTS

WO    2008119383 A1    10/2008

OTHER PUBLICATIONS

International Search Report and Written Opinion in PCT Application No. PCT/US2019/040289 dated Dec. 20, 2019; 17 pages.

*Primary Examiner* — Jeff A Burke
*Assistant Examiner* — Kyle T Johnson
(74) *Attorney, Agent, or Firm* — Mark H. Whittenberger, Esq.; Holland & Knight LLP

(57) ABSTRACT

Embodiments of the present disclosure are directed towards a robotic system and method, which may include one or more robots. The system may include a robotic system having a maximum number of degrees of freedom. The system may further include a graphical user interface configured to receive a natural robot task having at least one natural workpiece constraint associated with the natural robot task. The system may also include a processor configured to identify a minimum number of degrees of freedom required to perform the natural robot task, wherein the minimum number of degrees of freedom is based upon, at least in part, the at least one natural workpiece constraint associated with the natural robot task.

42 Claims, 23 Drawing Sheets

(56) References Cited

U.S. PATENT DOCUMENTS

| | | | |
|---|---|---|---|
| 7,680,300 B2 | 3/2010 | Chang et al. | |
| 8,301,421 B2 | 10/2012 | Bacon et al. | |
| 8,408,918 B2 | 4/2013 | Hu et al. | |
| 8,428,781 B2 | 4/2013 | Chang et al. | |
| 9,321,176 B1* | 4/2016 | Sun | B25J 9/1656 |
| 9,357,708 B2 | 6/2016 | Chang et al. | |
| 9,375,839 B2* | 6/2016 | Ota | B25J 9/1669 |
| 2005/0166413 A1* | 8/2005 | Crampton | B25J 13/088 |
| | | | 33/503 |
| 2007/0274812 A1 | 11/2007 | Ban et al. | |
| 2011/0172819 A1* | 7/2011 | Lee | B25J 9/1676 |
| | | | 700/253 |
| 2012/0017507 A1* | 1/2012 | Owens, Jr. | A01G 9/143 |
| | | | 47/1.01 P |
| 2013/0158709 A1* | 6/2013 | Shi | B25J 5/02 |
| | | | 700/259 |
| 2013/0211593 A1* | 8/2013 | Domae | B25J 9/1612 |
| | | | 700/258 |
| 2014/0163729 A1* | 6/2014 | Shi | B25J 9/1612 |
| | | | 700/245 |
| 2015/0199458 A1 | 7/2015 | Bacon et al. | |
| 2016/0008978 A1* | 1/2016 | Oguri | B25J 9/1612 |
| | | | 702/152 |
| 2016/0052043 A1* | 2/2016 | Dietz | B25J 17/0208 |
| | | | 29/407.1 |
| 2016/0321381 A1 | 11/2016 | English et al. | |
| 2017/0143442 A1* | 5/2017 | Tesar | H04N 13/398 |
| 2017/0320211 A1 | 11/2017 | Akan et al. | |
| 2018/0060459 A1 | 3/2018 | English et al. | |
| 2018/0354130 A1* | 12/2018 | Preisinger | B25J 9/1694 |
| 2019/0063907 A1* | 2/2019 | Grau | H04N 5/3572 |
| 2019/0231458 A1* | 8/2019 | DiMaio | A61B 34/70 |
| 2019/0258275 A1* | 8/2019 | Saunders | B25J 15/00 |
| 2019/0321984 A1* | 10/2019 | Yamazaki | B25J 9/1612 |
| 2019/0358813 A1* | 11/2019 | Graham | B25J 18/02 |
| 2019/0358817 A1* | 11/2019 | Ghazaei Ardakani | |
| | | | B25J 13/025 |
| 2020/0001457 A1* | 1/2020 | Limone | B25J 9/1697 |

* cited by examiner

SYSTEM AND METHOD FOR NATURAL TASKING OF ONE OR MORE ROBOTS

The invention was supported by Air Force SBIR contract: FA8650-17-P-5043. The U.S. Government has certain rights in the invention.

FIELD OF THE INVENTION

The invention generally relates to robotics and more specifically to a system and method for under-constraining a robot or robotic system.

BACKGROUND

Tasking a robot is difficult, and this difficulty is exacerbated by tasking robots in an unnatural, over constrained way. Natural tasking is a comprehensive approach to specifying robotic tasks easily without over- or under-constraint. A gymnast, for example, does not model the exact position of hand placements on bars, but rather models the bars as having one degree of freedom in placement. Similarly, tasks like welding and painting have an extra degree of freedom in how the electrode or nozzle is rotated about its primary axes, and the operator tasking a robot benefits by working with these natural constraints. Similarly, a part to be grasped by an industrial robot may have symmetry that allows grasping in multiple ways. Natural tasking specifies the constraint on the robot in its minimal and least restrictive, way.

SUMMARY

In one or more embodiments of the present disclosure, a system is provided. The system may include a robotic system having a maximum number of degrees of freedom. The system may further include a graphical user interface configured to receive a natural robot task having at least one natural workpiece constraint associated with the natural robot task. The system may also include a processor configured to identify a minimum number of degrees of freedom required to perform the natural robot task, wherein the minimum number of degrees of freedom is based upon, at least in part, the at least one natural workpiece constraint associated with the natural robot task.

One or more of the following features may be included. The at least one natural workpiece constraint associated with the natural robot task may be selected from the group including directional constraints, assignment to a curve or surface, distance constraints, joint positions, linear and nonlinear functional combinations of joint positions, workpiece geometry, workpiece features, center of mass, and linear and angular momentum. The system may include a scanner configured to identify the at least one natural workpiece constraint associated with the natural robot task. The system may include a simulator configured to determine a feasible or an optimized implementation of the natural robot task. In some embodiments, receiving the natural robot task may be received in conjunction with a learning demonstration. The minimum number of degrees of freedom may be less than the maximum number of degrees of freedom. The at least one natural workpiece constraint associated with the natural robot task or the identification of a minimum number of degrees of freedom may be specified by a user. The at least one natural workpiece constraint associated with the natural robot task or the identification of a minimum number of degrees of freedom may be determined automatically, in response to the scanner identification. The at least one natural workpiece constraint associated with the natural robot task or the identification of a minimum number of degrees of freedom may be updated in real-time during an operation of the robotic system. The minimum number of degrees of freedom may be based upon, at least in part, sensor data. The at least one natural workpiece constraint associated with the natural robot task or the identification of a minimum number of degrees of freedom may be updated using a communication channel before, during, or after an operation of the robotic system. The graphical user interface may be at least one of a two-dimensional interface or a three-dimensional interface. The minimum number of degrees of freedom may be identified without referencing a robotic system frame used to control the robotic system. The minimum number of degrees of freedom may be identified by referencing only one or more features and a geometry of a workpiece. The processor may be configured to control the robotic system to perform the natural robot task by exploring an extra degree of freedom, wherein the extra degree of freedom is based upon, at least in part, a different between the maximum number of degrees of freedom and the minimum number of degrees of freedom. Exploring the extra degree of freedom may include optimizing a criteria using the extra degrees of freedom to solve a gradient-based problem that seeks to minimize the criteria. The processor and scanner may be configured to define a workspace prior to performing a robotic task. The natural robot task may include at least one natural environmental constraint associated with the natural robot task. The at least one natural workpiece constraint may include one or more geometrical features associated with a particular workpiece. The at least one natural environmental constraint includes a peg-in-hole insertion, line following, camera pointing, grasping a symmetrical object, placing an object on a flat surface, contacting a flat object with a suction cup, steering a mobile base, or controlling the center of mass of a mobile robot to product stability.

In another embodiment of the present disclosure, a method is provided. The method may include providing a robotic system having a maximum number of degrees of freedom associated therewith. The method may further include receiving, at a graphical user interface, a natural robot task having at least one natural workpiece constraint associated with the natural robot task. The method may also include identifying, using at least one processor, a minimum number of degrees of freedom required to perform the natural robot task, wherein the minimum number of degrees of freedom is based upon, at least in part, the at least one natural workpiece constraint associated with the natural robot task.

One or more of the following features may be included. The at least one natural workpiece constraint associated with the natural robot task may be selected from the group including directional constraints, assignment to a curve or surface, distance constraints, joint positions, linear and nonlinear functional combinations of joint positions, workpiece geometry, workpiece features, center of mass, and linear and angular momentum. The method may include identifying, based upon, at least in part, a scanner, the at least one natural workpiece constraint associated with the natural robot task. The method may further include determining, based upon, at least in part, a simulation, a feasible or an optimized implementation of the natural robot task. In some embodiments, receiving the natural robot task may be received in conjunction with a learning demonstration. The minimum number of degrees of freedom may be less than the maximum number of degrees of freedom. The at least one natural workpiece constraint associated with the natural robot task or the identification of a minimum number of degrees of freedom may be specified by a user. The at least one natural workpiece constraint associated with the natural robot task or the identification of a minimum number of degrees of freedom may be determined automatically, in response to the scanner identification. The at least one natural workpiece constraint associated with the natural robot task or the identification of a minimum number of degrees of freedom may be updated in real-time during an operation of the robotic system. The minimum number of degrees of freedom may be based upon, at least in part, sensor data. The at least one natural workpiece constraint associated with the natural robot task or the identification of a minimum number of degrees of freedom may be updated using a communication channel before, during, or after an operation of the robotic system. The graphical user interface may be at least one of a two-dimensional interface or a three-dimensional interface. The minimum number of degrees of freedom may be identified without referencing a robotic method frame used to control the robotic system. The minimum number of degrees of freedom may be identified by referencing only one or more features and a geometry of a workpiece. The method may further include controlling, using the at least one processor, the robotic system to perform the natural robot task by exploring an extra degree of freedom, wherein the extra degree of freedom is based upon, at least in part, a different between the maximum number of degrees of freedom and the minimum number of degrees of freedom. The method may also include defining a workspace prior to performing a robotic task wherein defining is based upon, at least in part, data from the processor and the scanner. The natural robot task may include at least one natural environmental constraint associated with the natural robot task. The at least one natural workpiece constraint may include geometrical features associated with a particular workpiece. The at least one natural environmental constraint may include a peg-in-hole insertion, line following, camera pointing, grasping a symmetrical object, placing an object on a flat surface, contacting a flat object with a suction cup, steering a mobile base, or controlling the center of mass of a mobile robot to product stability. A manipulator Jacobian may be used, at least in part, to calculate motion associated with the robotic system.

BRIEF DESCRIPTION OF THE DRAWINGS

For a better understanding of the nature and objects of the present disclosure, reference is made to the following detailed description taken in conjunction with the following drawings, in which.

DETAILED DESCRIPTION

Embodiments of the subject application may include concepts from U.S. Pat. Nos. 6,757,587, 7,680,300, 8,301,421, 8,408,918, 8,428,781, 9,357,708, U.S. Publication No. 2015/0199458, U.S. Publication No. 2016/0321381, and U.S. Publication No. 2018/0060459, the entire contents of each are incorporated herein by reference in their entirety.

Figure 1:
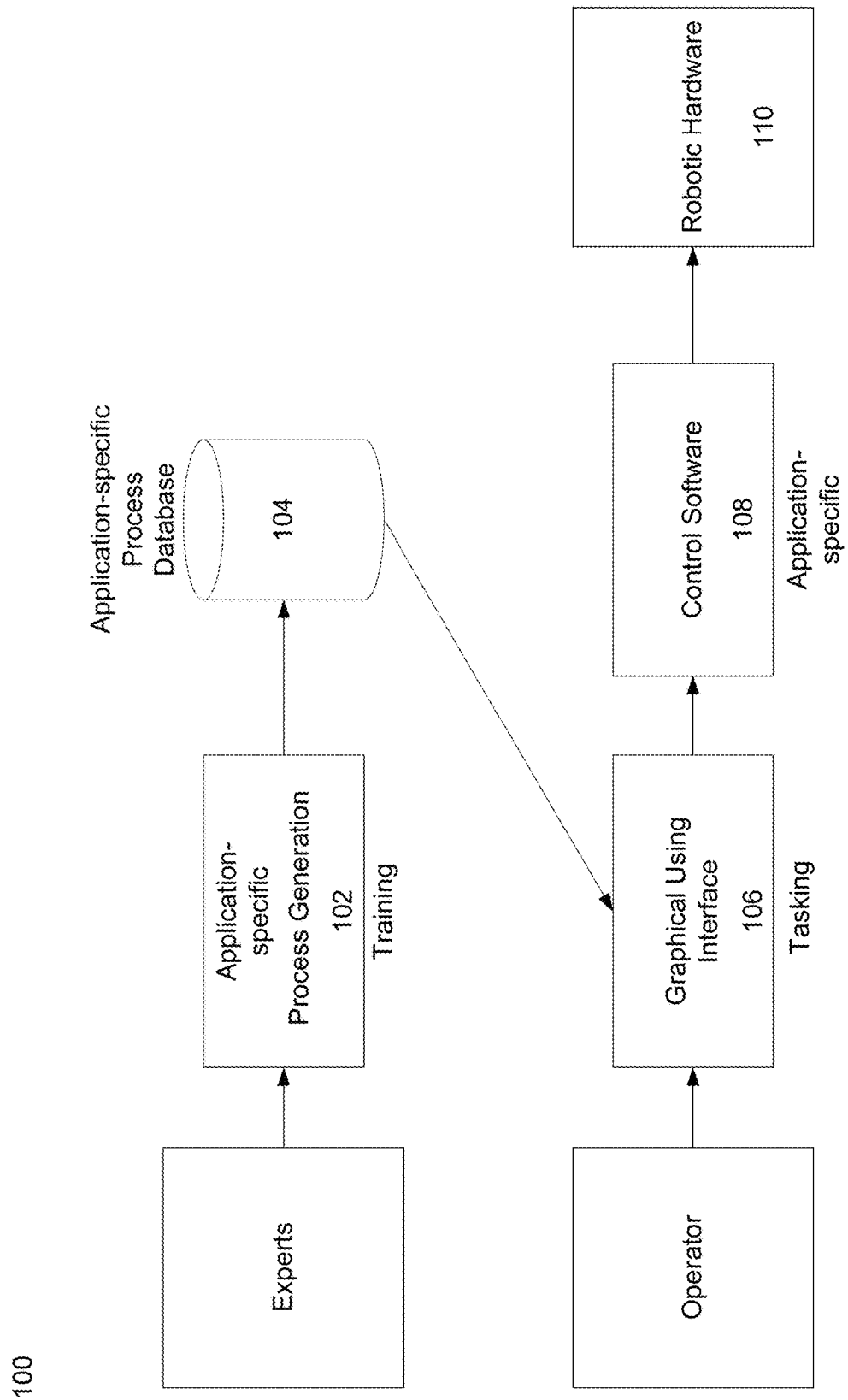
FIG. 1 is a block diagram of a natural tasking robotic system, according to an embodiment of the present disclosure.

Referring now to FIG. 1, an embodiment of a natural tasking robotic system 100 is provided. System 100 may include a plurality of components, portions of which may be designed for a particular application and/or task. The first component of the system may include a software system 102 for adding new processes to a database 104. Once built, database 104 may be reused by operators in the field or remotely. Operators may select an element from the database 104 using a graphical user interface 106 for execution by the control software 108 as is shown in FIG. 1. Procedures for the particular application and/or task (e.g. welding, robotic assembly, etc.) may be added to database 104 by experts offline. This database 104 may be used with a graphical user interface 106 and tasking software online to develop each procedure for each task. The software modules may include, but are not limited to training, tasking, and performance of the particular task, etc. All of this may be used to control the manner of operation of robotic hardware 110. Robotic hardware 110 may respond to the controls received from control software 108, however, it should be noted that the robotic hardware itself may be limited by its own maximum number of degrees of freedom as is discussed in further detail hereinbelow.

In a robotic system, the phrase "degrees of freedom" may refer to specific, defined modes in which a mechanical device or system can move. The number of degrees of freedom may be equal to the total number of independent displacements or aspects of motion. For example, a six degrees of freedom ("6 DOF") scenario may refer to the freedom of movement of a rigid body in three-dimensional space. Specifically, the body may be free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). In contrast, placing a point in space may correspond three degrees of freedom, specifying a distance between two points on different links is one degree of freedom, etc.

In some embodiments, the phrase "robotic system", as used herein, may include a system of one, two, and/or any number of robots. In this way, an entire robotic system DOF may refer to the sum of the DOFs on each of the individual robots. This may include one DOF for each single-axis joint, and six DOF for a free-moving base. For example, for a robotic system that includes two robots, one having 6 DOF and the other having 5 DOF, the available entire robotic system degrees of freedom may be 11 DOF.

Embodiments included herein may be configured to explore an extra number of degrees of freedom of one or many robots to perform a robotic task naturally. In this example, an entire robotic system may include a maximum number of degrees of freedom associated therewith DOF ("N") and may also include a minimum number of DOF ("M") subtracted therefrom.

Figure 2:
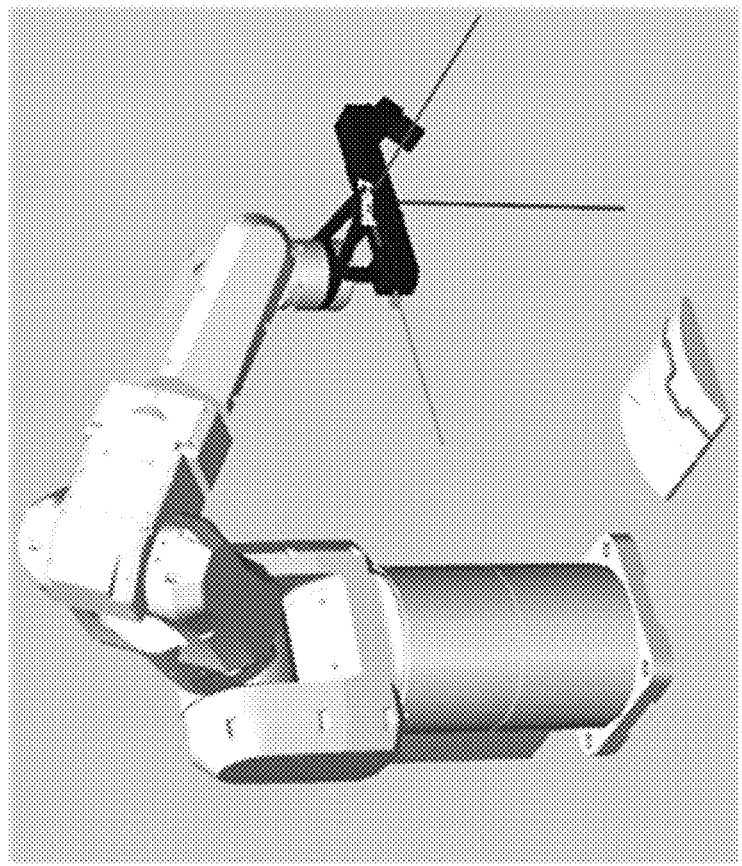
FIG. 2 is a graphical user interface showing multiple degrees of freedom of a natural tasking robotic system, according to an embodiment of the present disclosure.
Figure 2:
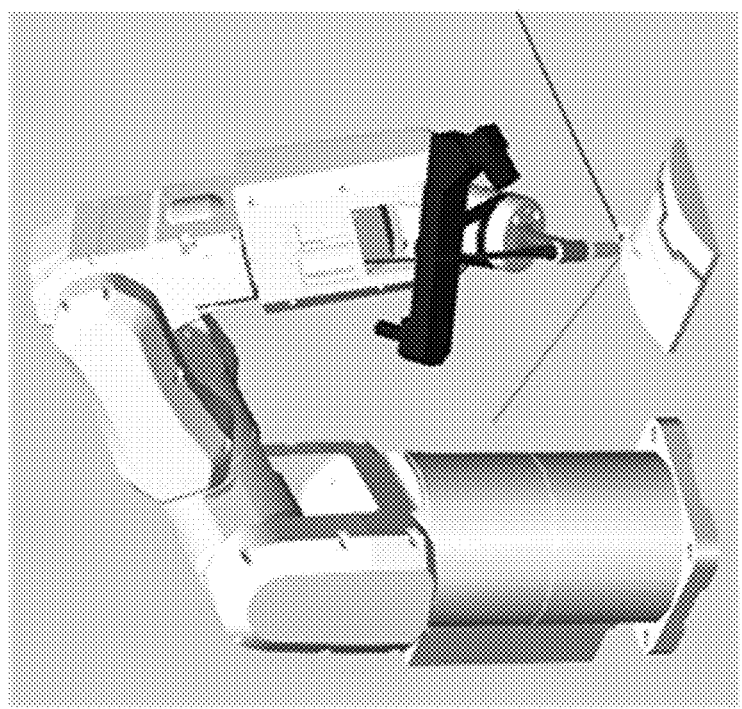

For example, and referring now to FIG. 2, a 3D rendering from a graphical user interface 200 depicting a welding tool having five degrees of freedom contrasted with a welding tool having six degrees of freedom, full 3D rotation and orientation, is provided. The difference between the two is the five degrees of freedom may be found by relaxing rotation about one axis. This particular model was tuned to optimize a scan and weld process. This involved configuring the bounding volumes around the scanner tool, as well as aligning the system and base primary frames to make the tool paths and point clouds appear in the correct locations. The tool offsets were also configured based on how the tool paths were created from the point clouds. The paths were created along the bottom of the seams, so an offset from the tip was configured so there were no collisions. As shown in FIG. 2, the arm may be constrained using two different constraint sets, with each one using a different tool offset, one for scanning the part and one for welding. The degrees of freedom set for scanning uses a six degree of freedom frame, and the welding set uses a five degree of freedom frame that allows the tip of the torch to freely rotate around the tip. This allows scanning for the part first, then relaxing of the degrees of freedom for the weld paths, which are more difficult for the robot to achieve given its workspace envelope.

Figure 3:
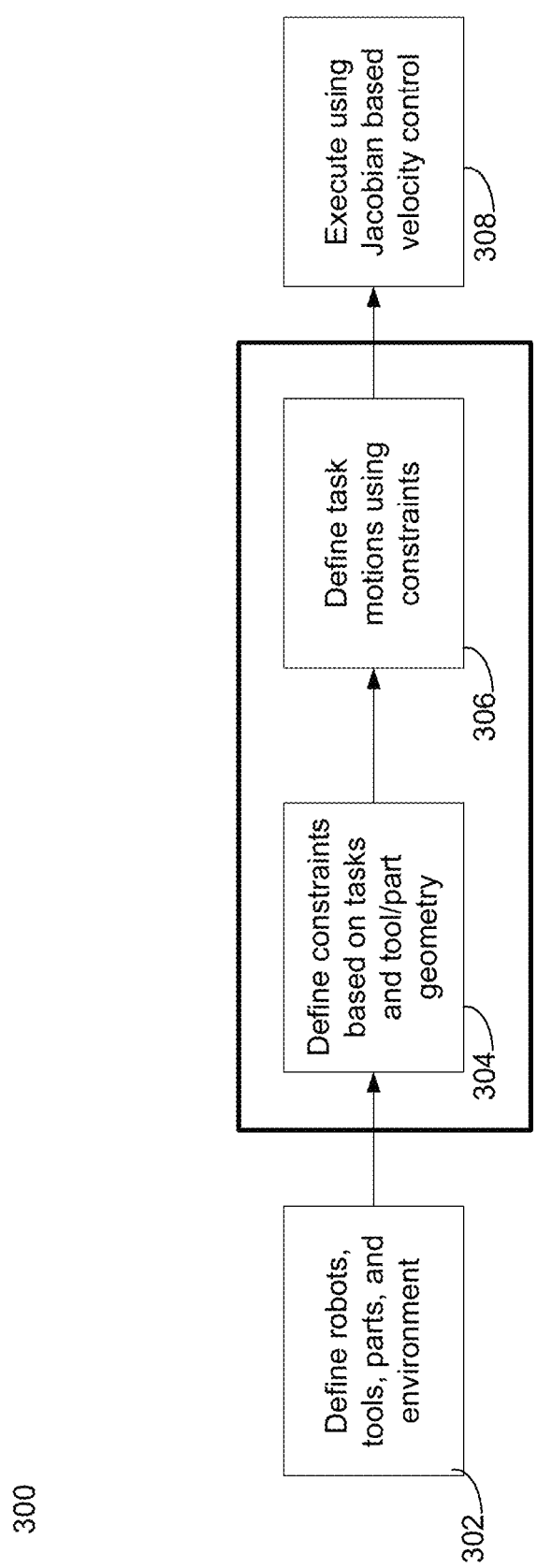
FIG. 3 is a block diagram of a natural tasking robotic system, according to an embodiment of the present disclosure.

In some embodiments, and referring now to FIG. 3, an embodiment depicting a flowchart having a number of operations consistent with a natural tasking robotic process is provided. Natural tasking process 300 may include defining 302 robots, tools, parts, and a robotic environment. Process 300 may further include defining 304 one or more constraints based upon, tasks, tool geometry, part geometry, etc. Process 300 may also include defining 306 one or more task motions using the constraints. Process 300 may be configured to define a minimal number of constraints naturally through analysis of geometry (e.g., tool geometry), such as by finding axes of symmetry or near-symmetry. In this way, the naturalness of the constraint as well as an ability to exploit extra degrees of freedom in robot motion allow for natural control over the robot. Natural control, may be based upon, at least in part, both natural constraints as well as natural optimization of those constraints, as will be discussed in further detail below. In operation, once naturally optimized, the task may be executed 308 using a Jacobian-based velocity control approach as is discussed below.

Figure 4:
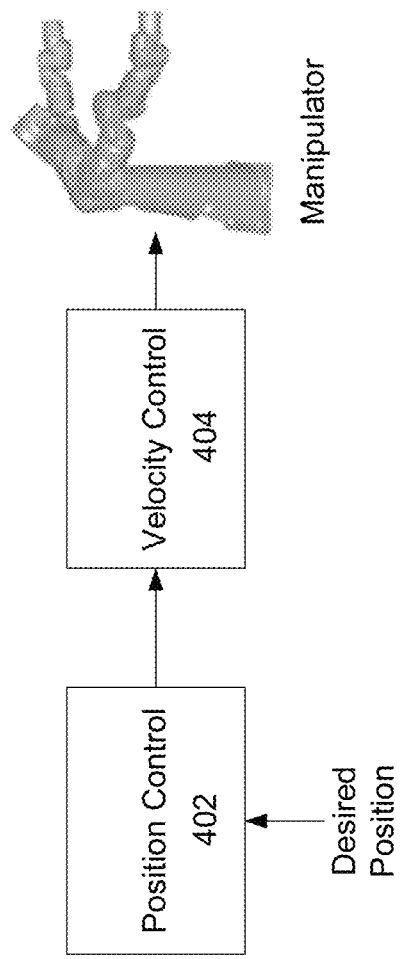
FIG. 4 is a block diagram of a velocity control approach for use in a natural tasking robotic system, according to an embodiment of the present disclosure.

In some embodiments, and referring now to FIG. 4, a block diagram 400 consistent with embodiments of the natural tasking robotic system of the present disclosure is provided. Control of the end effectors of the robotic arms in a system may be accomplished using multiple components (e.g., using Energid's Actin® software available from the Assignee of the present disclosure). These components may include, but are not limited to, outer position controller 402 and inner velocity controller 404. This combined control system 400 allows the program to "fly" the end effector throughout task space by specifying a desired placement, and joint velocities and positions may be calculated automatically. This frees the operator to focus on the task, rather than low-level control of the robot.

In some embodiments, the core velocity framework may be based on the manipulator Jacobian equation:

$$V = J(q)\dot{q} \quad (1)$$

Here V is an m-length vector representation of the motion of the hand or hands (usually some combination of linear and angular velocity referenced to points rigidly attached to parts of the manipulator); q is the n-length vector of joint positions (with $\dot{q}$ being its time derivative); and J is the m×n manipulator Jacobian, a function of q. (For spatial arms with a single end effector, V is often the frame velocity with three linear and three angular components. As used herein, it takes on a larger meaning that includes the concatenation of point, frame, or other motion of multiple end-effectors.) The Jacobian J(q) is the matrix that makes ( ) true for all possible values of $\dot{q}$. Note V can represent a concatenation of values for multiple end effectors, enabling coordinated motion of multiple points on the manipulator.

The velocity control question is the following: given a desired tool motion V, what are the joint rates $\dot{q}$ that best achieve this motion? To answer this, the framework is based, in part, on the approach below, which uses a scalar a, a matrix function W(q), and a scalar function $f(q)$ to solve for $\dot{q}$ given V through the following formula:

$$\dot{q} = \begin{bmatrix} J \\ N_J^T W \end{bmatrix}^{-1} \begin{bmatrix} V \\ -\alpha N_J^T \nabla f \end{bmatrix} \qquad (2)$$

Where $\nabla f$ is the gradient of $f$ and $N_J$ is an n×(n×m) set of vectors that spans the null space of J. That is, $JN_J=0$, and $N_J$ has rank (n×m). Both $\nabla f$ and NJ are generally functions of q. By changing the values of $\alpha$, W, and $f$ many new and most established velocity-control techniques can be implemented.

Embodiments of the present disclosure, however, go beyond the formulation above to create a more general framework. Instead of insisting on the use of the gradient of a function, a general column vector F(q) is used. Not all vector functions are gradients. This minor, but important, modification yields the following formula:

$$\dot{q} = \begin{bmatrix} J \\ N_J^T W \end{bmatrix}^{-1} \begin{bmatrix} V \\ -\alpha N_J^T F \end{bmatrix} \qquad (3)$$

$$\tfrac{1}{2}\dot{q}^T W \dot{q} + \alpha F^T \dot{q} \qquad (4)$$

The parameters $\alpha$, W and F can be defined using XML, to give many different types of velocity control.

In some embodiments, position control system 402 may build upon the velocity control system 404 to give robust position control to the end effectors. A position control module may be supplied as an interface to the position control system 402 to enable the addition of new position control algorithms. Position control system 402 may provide basic position control for the end effectors by building upon velocity control system 404. Given the joint velocities from velocity control system 404, position control system 402 may use Euler integration to calculate the joint positions. Once the joint positions are calculated, the end effector positions are known. The control system may check for joint limit exceedance and collisions as it is iterated forward in time. It may also zero the joint rate commands if a singularity is detected.

For example, a key component of the robot control, which may involve multiple mechanisms, is to avoid collisions with the environment. For this a collision avoidance algorithm may be used based on defined bounding volumes for every shape of interest in the simulation. This algorithm employs a gradient-based method that seeks to minimize the function with the general form as follows:

$$f(q) = \sum_{i=1}^{N} \sum_{j=1}^{B} F^p(i, j) \qquad (5)$$

Here N is the number of links in the manipulator, B is the number of obstacles in the environment, p is a user-defined exponent, and F(i,j) is a measure of the proximity of the bounding volume of i to the bounding volume of link j. F(i,j) is zero when the distance is larger than a user-specified threshold, and within the threshold, it is just a scalar constant times the minimum distance needed to move one bounding volume to take it outside the threshold distance from the other bounding volume.

In some embodiments, this function may be used with finite differencing to calculate its gradient, which may then be used as the vector parameter to the core control system to drive the manipulators in a direction that avoids collisions. Here, the obstacles in the environment may be well defined, such as for other manipulators that broadcast their state, or it may be determined in real-time, from vision or other sensing mechanisms.

In some embodiments, the control methodologies discussed above may be used, at least in part, to allow for the controller to relate the entire robotic system DOF (e.g., the available DOF of the system, "N") to the required minimum number of degrees of freedom identified based on the workpiece constraints alone ("M"). In other words, the robotic system and method described herein may only need workpiece data in order to execute a natural robot task. In some cases, the DOF may be based upon other factors as well, including but not limited to, other factors or constraints, however this information may not be necessary. Embodiments of the natural tasking robotic system and methods provided herein may be available to provide better control and/or increased performance of the robotic system, more feasible and/or optimized solutions for a robotic task, etc.

Figure 5:
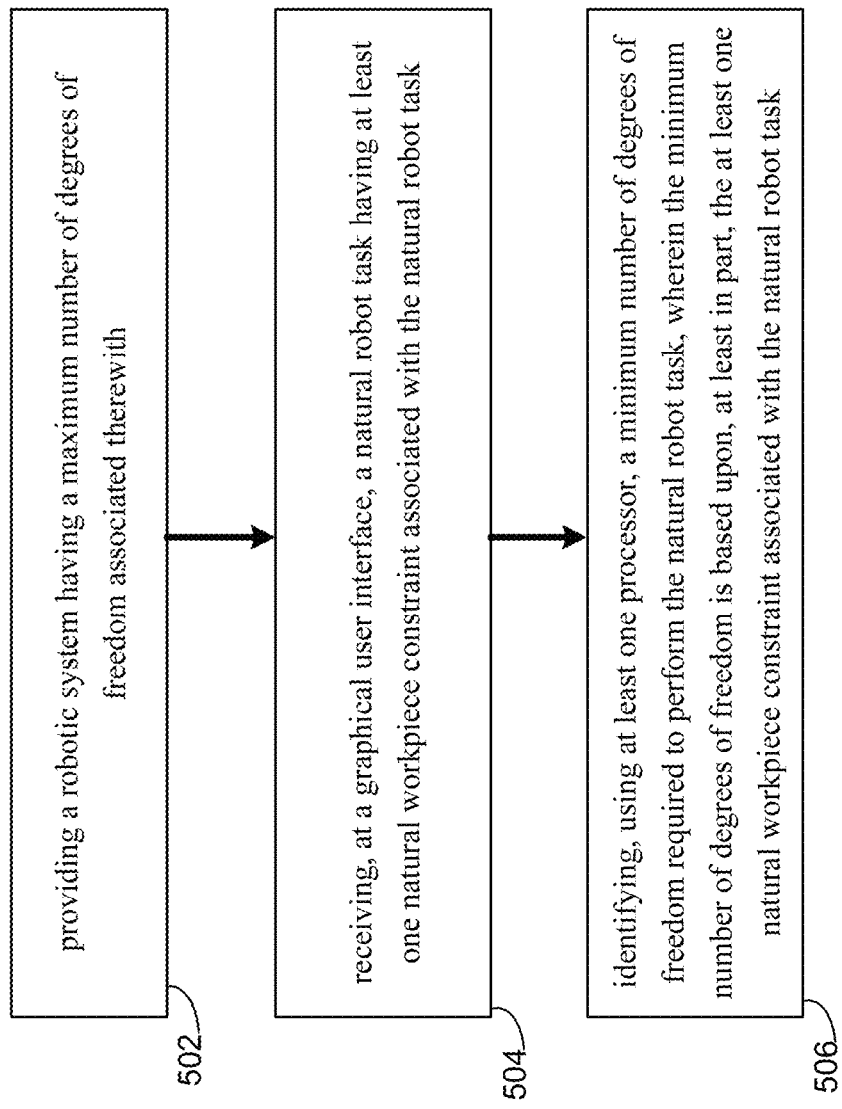
FIG. 5 is a flowchart of a natural tasking robotic method, according to an embodiment of the present disclosure.
Figure 6:
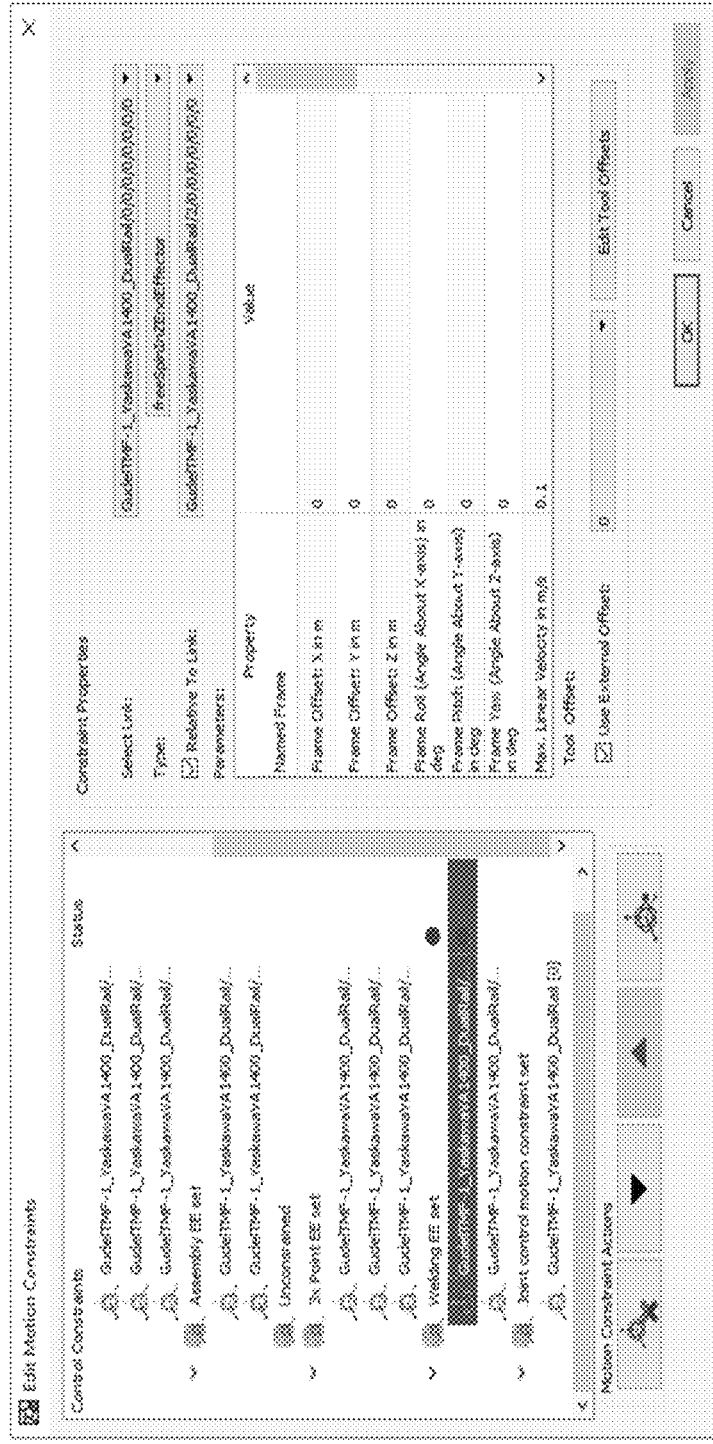
FIG. 6 is a graphical user interface of a natural tasking robotic system, according to an embodiment of the present disclosure.
Figure 7:
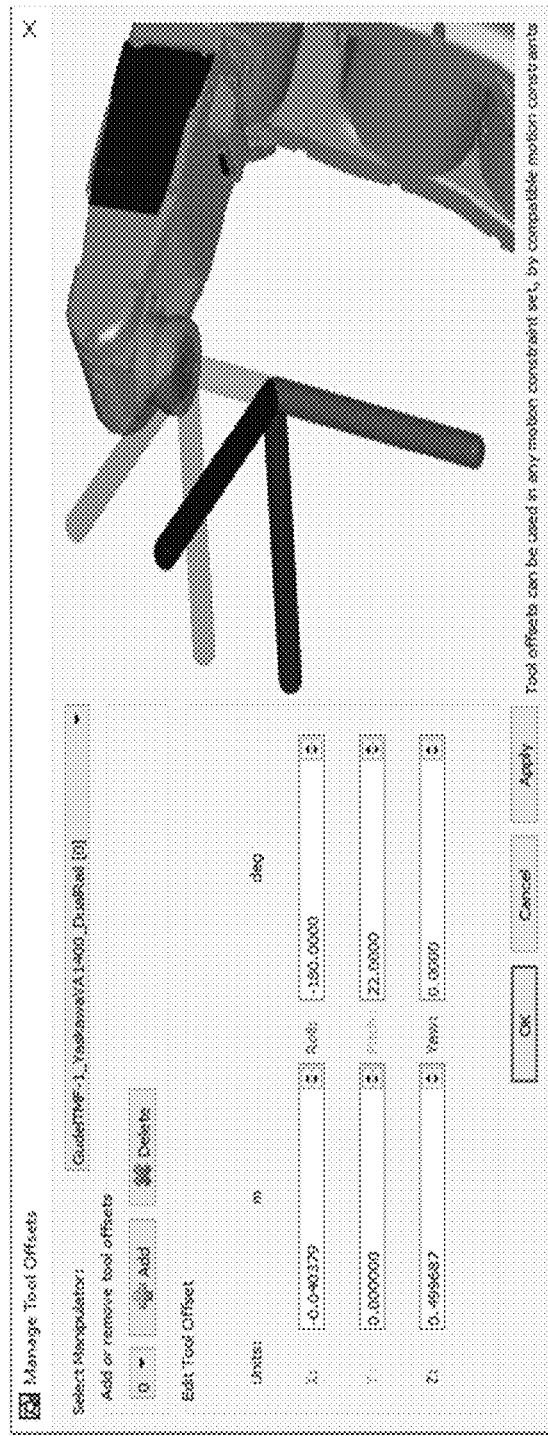
FIG. 7 is a graphical user interface of a natural tasking robotic system, according to an embodiment of the present disclosure.

In some embodiments, and referring now to FIG. 5, an embodiment depicting a flowchart having a number of operations consistent with a natural tasking robotic process 500 is provided. The process 500 may include providing 502 a first robot of one or more robots, the first robot having a maximum number of degrees of freedom associated therewith. Process 500 may further include receiving (504), at a graphical user interface, a natural robot task having at least one natural workpiece constraint associated with the natural robot task. Process 500 may also include identifying (506), using at least one processor, a minimum number of degrees of freedom required to perform the natural robot task, wherein the minimum number of degrees of freedom is based upon, at least in part, the at least one natural workpiece constraint associated with the natural robot task.

The phrase "maximum number of degrees of freedom" may refer to a maximum number of specific, defined modes in which a mechanical device, robot(s), and/or system may move. The phrase "minimum number of degrees of freedom" may refer to a minimum number of specific, defined modes in which a mechanical device, robot(s), and/or system move to execute a task naturally. The phrase "natural robot task" may refer to a task that may be performed using a reduced and/or simplified amount of motion. In some cases specifying a natural robot task may be contrasted with a math intensive way of specifying a task that may require a user to specify in robotic system's coordinate/frame The natural robot task may be specified/demonstrated to the robotic system using one or more robots or tools and the minimum number of degrees of freedom may be determined based upon, at least in part, the natural robot task. The minimum number of degrees of freedom may be determined through analysis of tool, robot, and/or workpiece geometry. It may be specified using a demonstration, teach to learn robotic techniques, using a GUI, etc.

In some embodiments, the naturalness of the task may refer to the degree of alignment between 1) the commanded robot task and 2) the actual desired thing to be done. Some examples are provided below:

Desired task (1): Place a cup on a desk.
  Unnatural: Place a cup with handle pointing to the right at x=30, y=50 cm from the corner.

Natural: Place the cup anywhere within the bounds of the table with the handle pointed in any direction.

Desired task (2): Point a camera on the robot at 3D point x=1, y=2, z=2 in space.

Unnatural: Place the camera at x=0, y=0.2, z=0.3 and pointed it at x=1, y=2, z=2.

Unnatural: Point the camera at {1,2,2} from any location with up in the image aligned with up in the real world.

Natural: With no constraint on camera position, point the camera at {1,2,2} with any orientation.

Desired task (3): Spray paint a part using a nozzle 1 m away and pointed directly at the center of the part.

Unnatural: Spray from 1 m away with the nozzle pointed at the part and specially oriented about its axis.

Natural: Spray from 1 m away with no special orientation of the nozzle other than pointing it at the part.

It should be noted that although these unnatural constraints may seem odd in how they over restrict robot motion, they are actually how these kind of tasks are typically performed. Embodiments of the natural robotic tasking system included herein allow using and solving for the natural representation.

In some embodiments, the phrase "natural workpiece constraint" may relate to geometrical features, material properties, and/or any other aspect associated with a particular workpiece. The phrase "natural environmental constraint" may relate to geometrical features, obstacles, material properties, and/or any other aspect associated with an environment that may be associated with a natural robot task.

In some embodiments, workpiece constraints, environmental constraints, and manipulator constraints may form a continuum in this approach, and multiple natural constraints can be combined to define a comprehensive tasking movement. Some of these may include, but are not limited to, directional constraints, orientation constraints, assignment to a curve or surface, distance constraints, joint positions, linear and nonlinear functional combinations of joint positions, center of mass, and linear and angular momentum. These constraints may vary as function of robot configuration. Tool offsets, static objects or obstacles, and dynamic objects or obstacles may be used to define and configure the constraints. In some embodiments, the identification of the minimum number of degrees of freedom may be based on the workpiece constraints geometry and/or its features, some of which may include, but are not limited to, holes, shapes, materials, sizes, etc.

In some embodiments, one or more constraints may be combined and/or specified by the user using a visual editor, such as the GUIs shown in FIGS. 6-12 to create complex combinations of constraints that change over time to best achieve a real-world task. It should be noted that some or all of these constraints may be changed during execution of a robot task or operation, even time step by time step, and may be combined with optimizations such as collision and joint-limit avoidance. In this way, the number and type of constraints may be updated, dynamically, in real-time. For example, in some embodiments, some or all of the constraints may be automatically determined and/or identified using a scanner that may be configured to scan the robotic environment to identify, allow for the necessary processing, and subsequent determinations. Various sensors and devices may be used to obtain this data, some of which may include, but are not limited to, data from lidar, stereo cameras, color cameras, multispectral cameras, etc. Additionally and/or alternatively, some or all of the constraints may be updated remotely over a communication channel (e.g., radio, laser, or network communication, etc.). The constraints are set using a 2D graphical user interface or a 3D interface (e.g., augmented reality, etc.). The constraints may be of the "less than or equal to" variety, not just "equal to". Accordingly, the natural tasking robotic system included herein may allow a user to constrain a point to be above the floor not just on it, for example.

Accordingly, embodiments of the natural tasking robotic system described herein may include one or more robots having a maximum number of degrees of freedom "N". In some embodiments, the system may allow a user to specify (e.g., teaching the robotic system by example, performing a robot "watch" and learn using one or more sensors, using a GUI such as a teach pendant to perform a demo, etc.) a task naturally by indicating only what needs to be done, such as insert a peg in a hole (using five degrees of freedom in constraint), follow a line with the tip of a welding tool (using three degrees of freedom in constraint), or point a camera at a location in space (using two degrees of freedom in constraint), etc. Specifying a task naturally may include specifying the task using a demonstration, for example, teaching or learning the robot how to perform the task. Additionally and/or alternatively, the user may not specify how the robotic system may perform the task and the system may determine how to perform the task automatically or using minimal inputs.

In some embodiments, the natural tasking robotic system described herein may be configured to determine the minimum number of degrees of freedom "M" that may be required to perform the natural robot task, while M<=N. The natural tasking robotic system may be configured to determine, via exploring the extra (N-M) extra degree of freedom, the most natural or efficient manner in which to perform the task. This may involve optimizing secondary criteria using the extra degrees of freedom, such as the criterion in (4). For example, a controller (e.g. Actin) may help to enable exploring the extra degrees of freedom (N-M) as discussed above. The extra number of degrees of freedom may be used to determine more convenient, faster, energy efficient, and/or feasible, "ways" to perform the task. The way or manner of performing may be based upon, at least in part, the determination of collision free paths, coordination of robots (if more than one), etc. In some embodiments, executing or performing the natural robot task may be at least partly employed using various software methodologies (e.g., using Energid's Actin® software available from the Assignee of the present disclosure). Determining the way or manner of performing the task naturally may also include using one or more simulators that may be configured to perform a simulation. The results of such a simulation may be used to determine how to perform the task.

In some embodiments, exploring the extra degrees of freedom (N-M) may include completely relaxing some DOF (e.g., the "Z" dimension). Additionally and/or alternatively, embodiments included herein may be configured to relax a DOF partially, for example, allow Z to free spin within +−15 degrees. The same concept may be applied to any DOF to provide flexibility when specifying a natural task. Accordingly, this may allow the robot system to find a solution in a more efficient manner.

Figure 8:
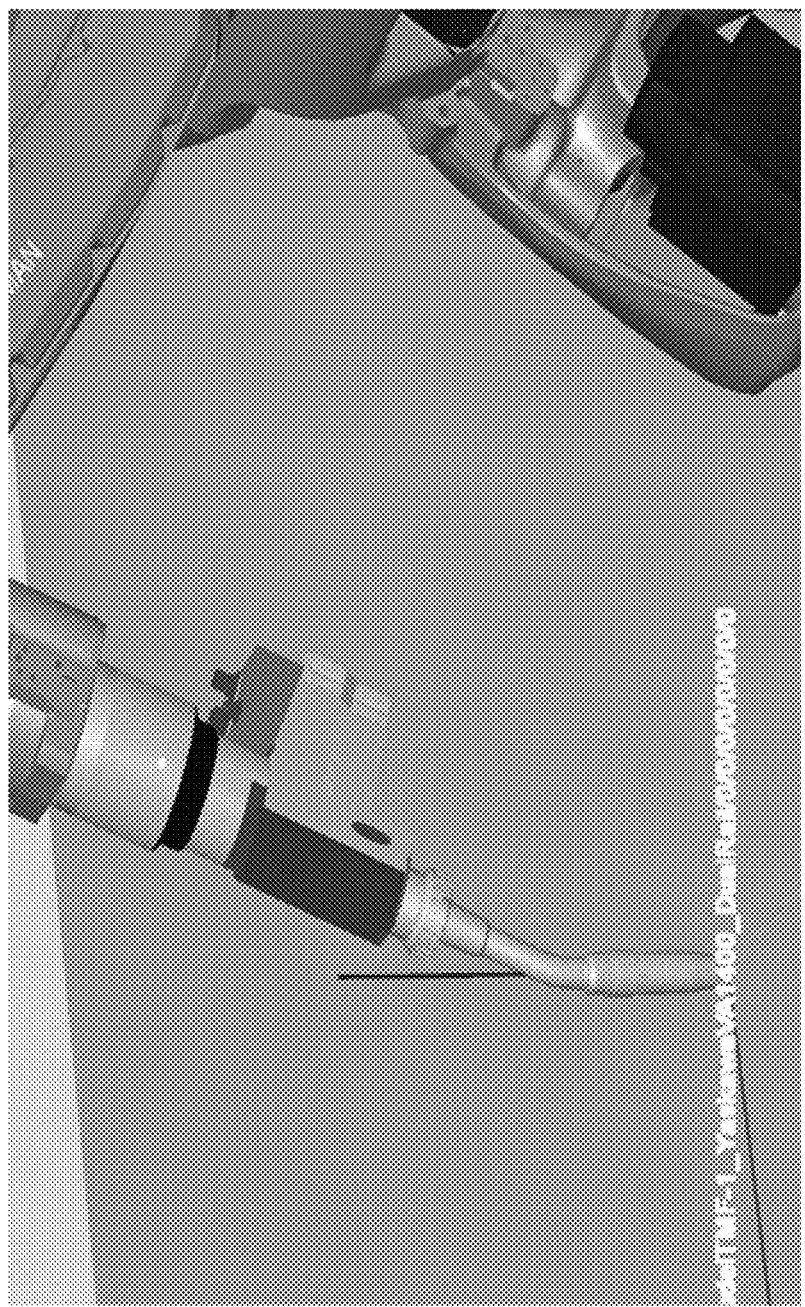
FIG. 8 is a graphical user interface of a natural tasking robotic system, according to an embodiment of the present disclosure.

Referring now to FIGS. 6-12, embodiments depicting graphical user interfaces consistent with a natural tasking robotic system are provided. As discussed above with reference to FIGS. 3 and 5, embodiments of the present disclosure may be configured to define how the robot or robots are constrained based on the task. This may involve only constraining what is necessary. For example, and referring to GUI 600 of FIG. 6, the user may define which links are constrained and how using the general spatial constraint. This may involve selecting a constraint, specifying velocities, and/or defining tool offsets based on the geometry. The user may also use GUI 700 of FIG. 7 to configure one or more tool or robot offsets as is shown in FIG. 8.

Figure 9:
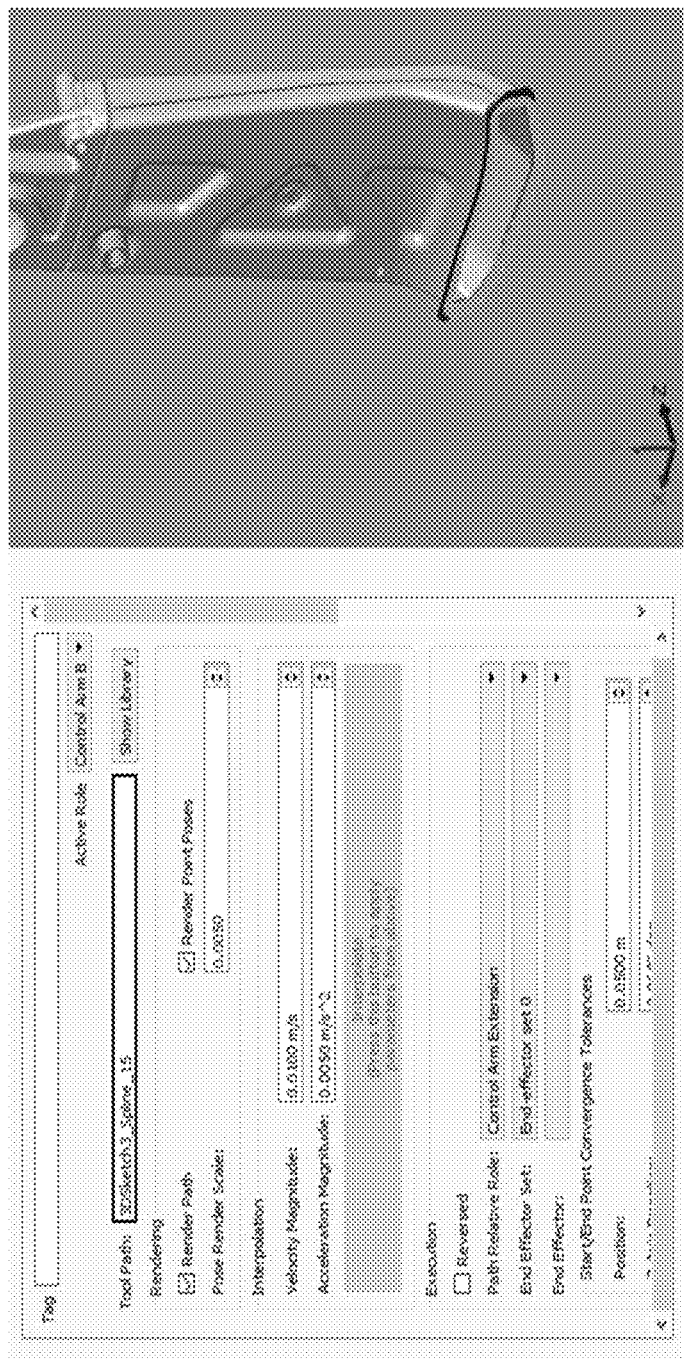
FIG. 9 is a graphical user interface of a natural tasking robotic system, according to an embodiment of the present disclosure.
Figure 10:
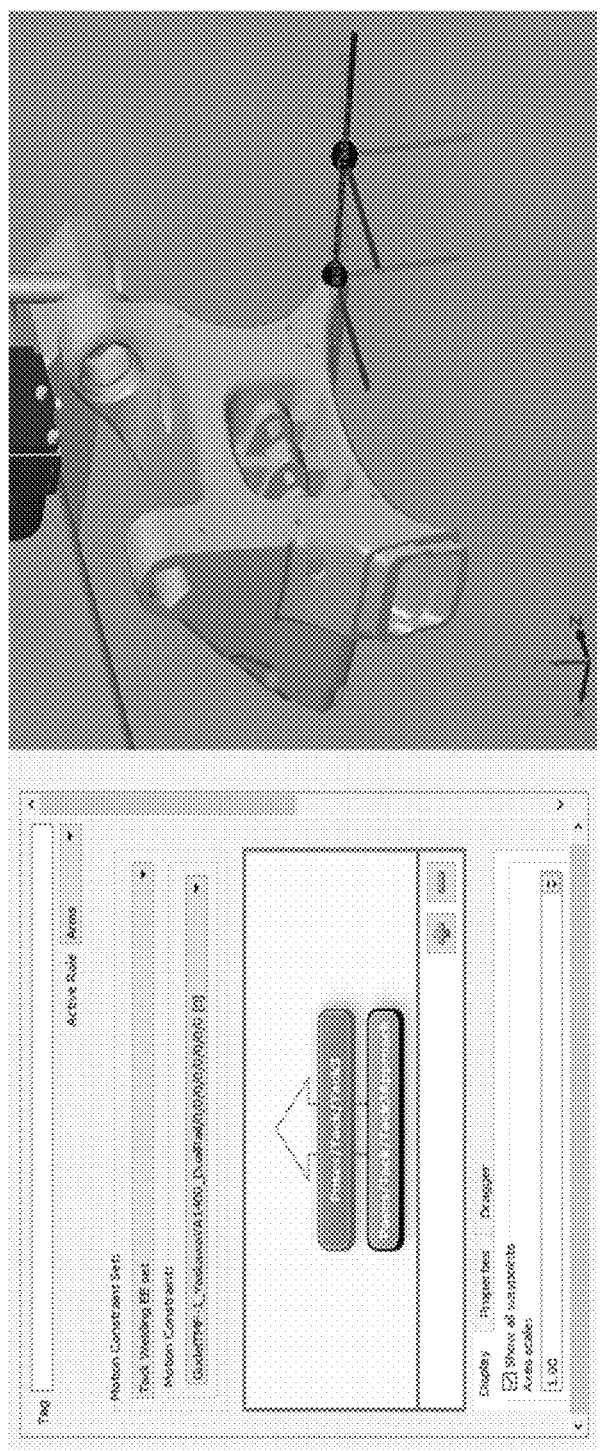
FIG. 10 is a graphical user interface of a natural tasking robotic system, according to an embodiment of the present disclosure.

Referring now to FIGS. 9-10 embodiments depicting graphical user interfaces 900, 1000 configured to define a tool path and a part-relative waypoint are provided respectively. In this example, the user may define the task relative to the objects to be manipulated (e.g., the tasks natural reference frame). This may be achieved using one or more waypoint poses, paths, and/or other custom defined motions. Each motion may include its own individual GUI. The final step may involve scripting out the order of the operations to be performed.

Figure 11:
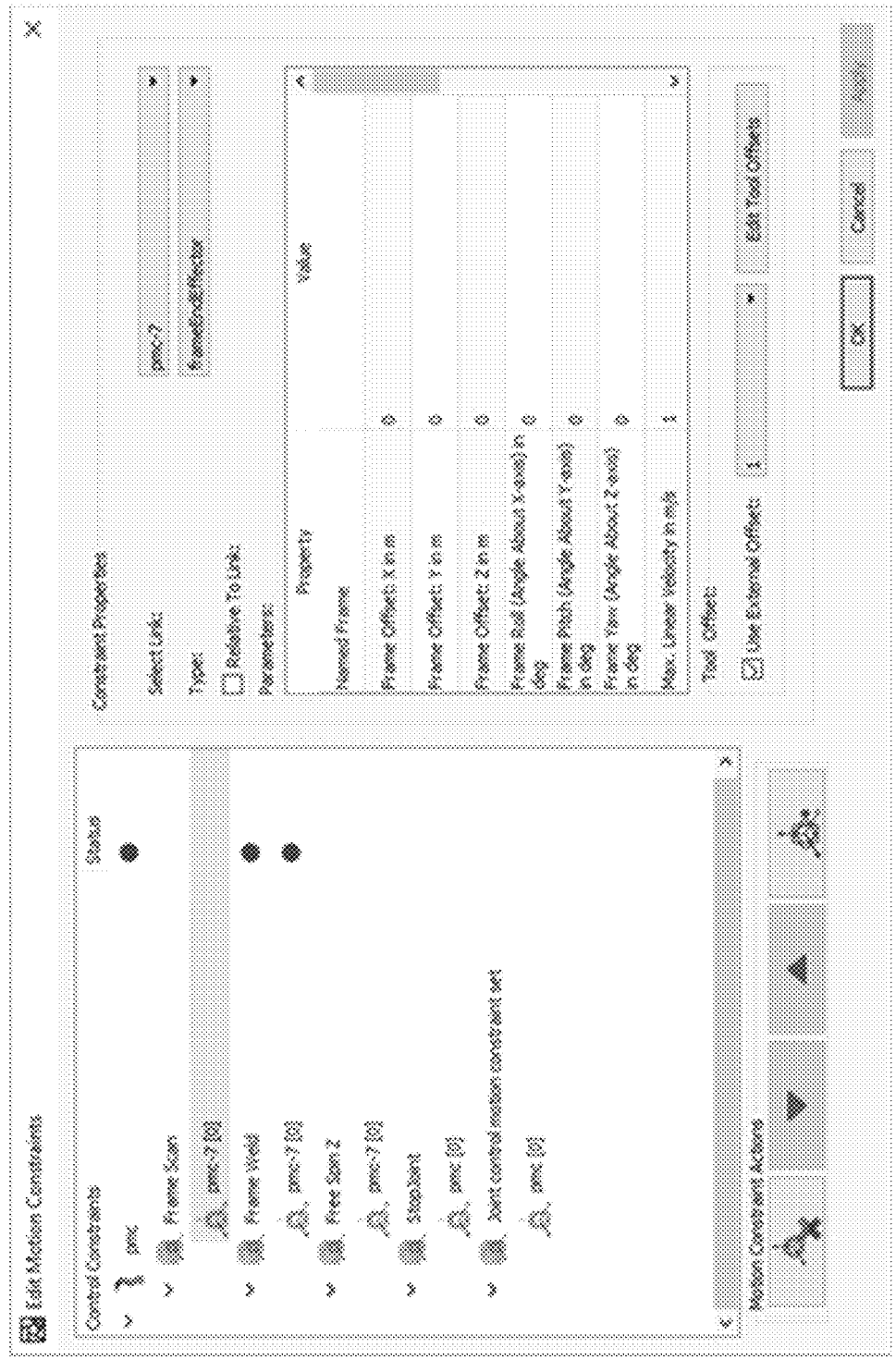
FIG. 11 is a graphical user interface of a natural tasking robotic system, according to an embodiment of the present disclosure.
Figure 12:
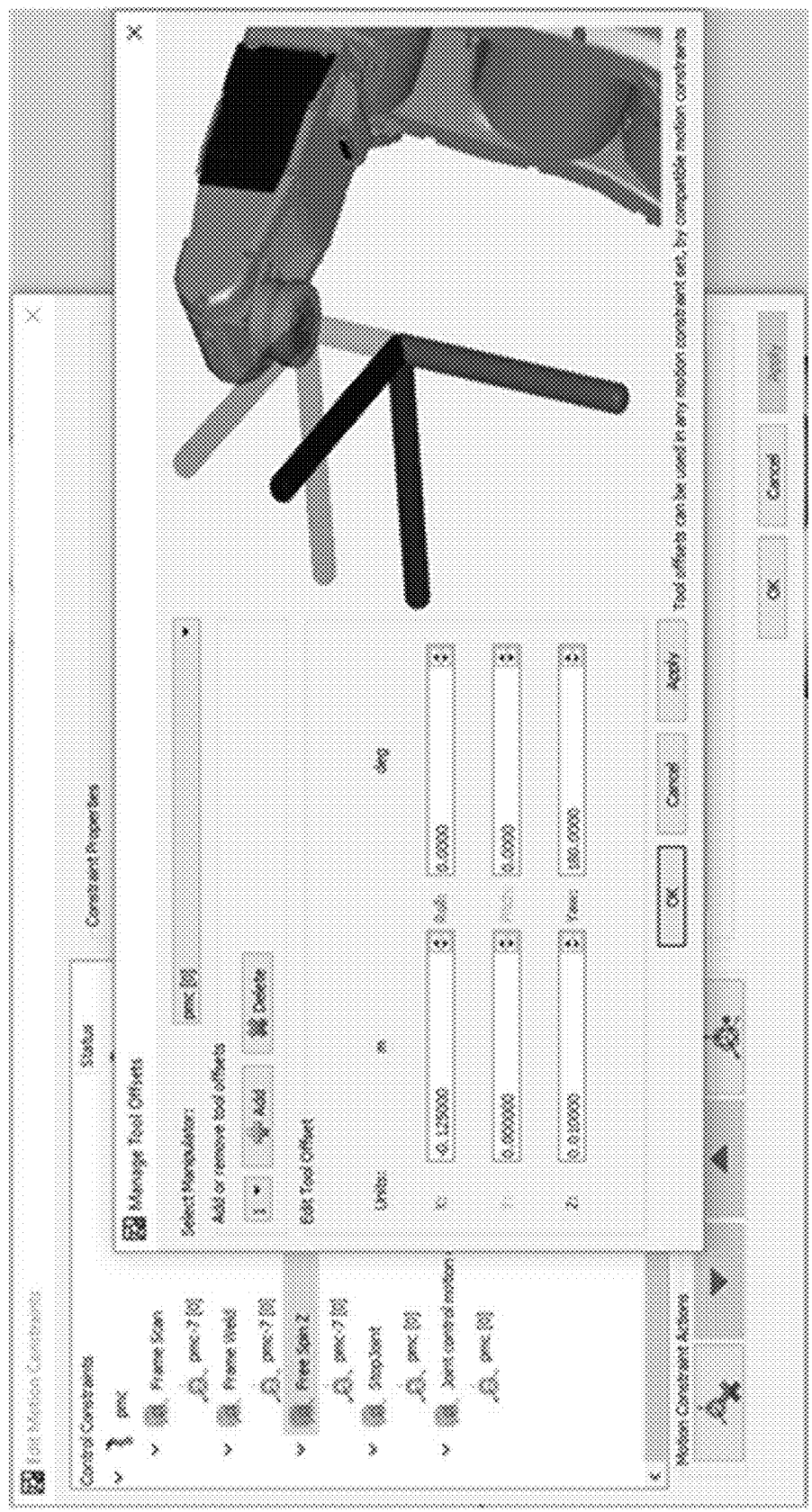
FIG. 12 is a graphical user interface of a natural tasking robotic system, according to an embodiment of the present disclosure.

Referring now to FIGS. 11-12 embodiments depicting graphical user interfaces 1100, 1200 configured to edit constraints and manage tool offset, respectively. FIG. 11 includes a constraint editor that includes an edit tool offset option. The "Edit Tool Offsets" option may allow users to edit the tool offset in context, as shown in FIG. 12. In operation, selecting the option may display a tool offset editor, pre-selected to the offset in use by the constraint.

Referring now to FIGS. 13-19, embodiments of a natural tasking robotic system as applied to a welding process are provided. In some embodiments, minimal constraints may be specified in their natural reference frame, further simplifying the tasking process. An example is a task performed by one robot on a part held by another, such as the welding task shown in FIG. 13. In this example, the welding task may be defined in the reference frame of the part being held by two robots. This constraint approach is natural in specifying exactly what needs to be done, and allowing motions of all robots to achieve it.

Figure 13:
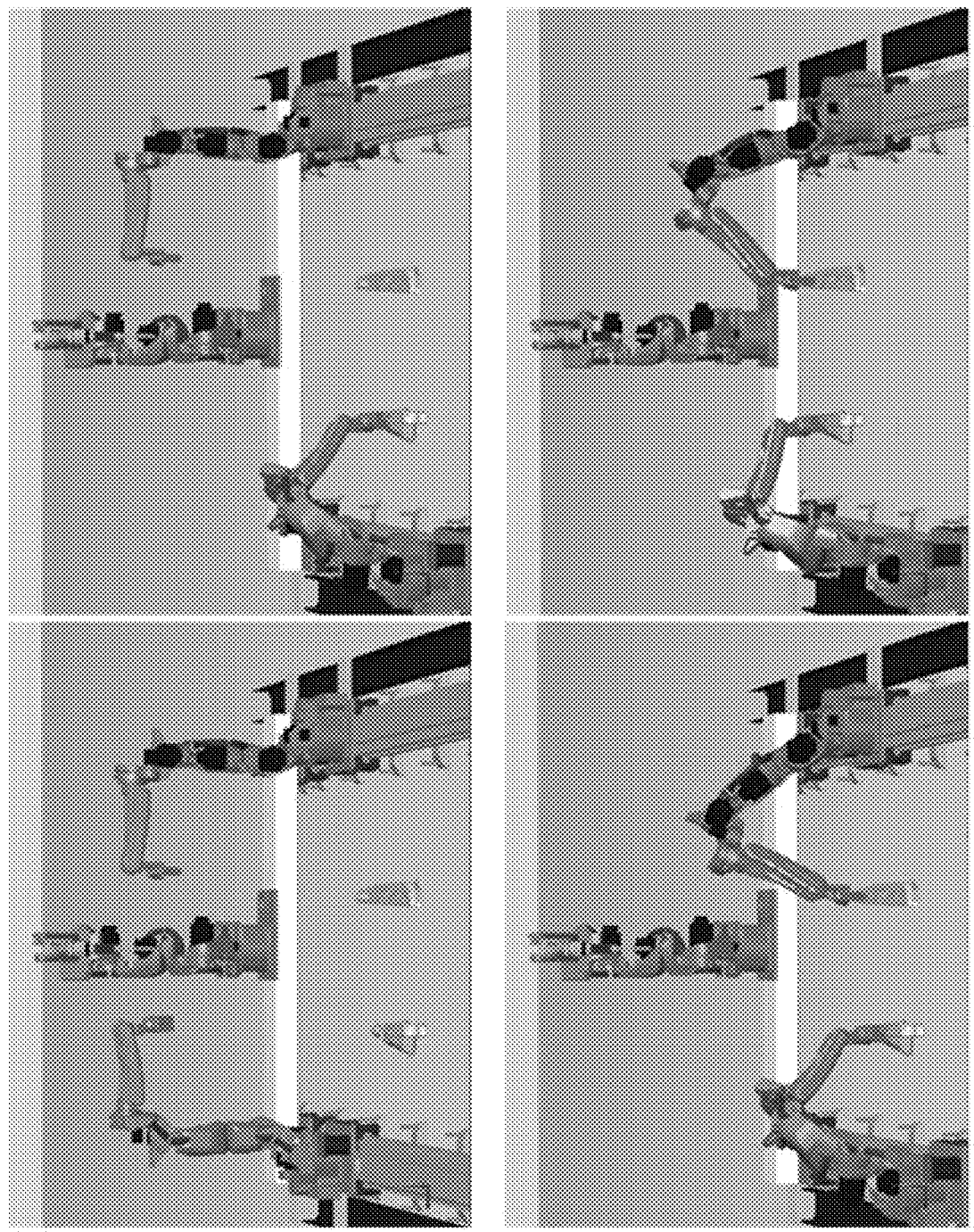
FIG. 13 is a graphical user interface of a natural tasking robotic system in a welding application, according to an embodiment of the present disclosure.
Figure 14:
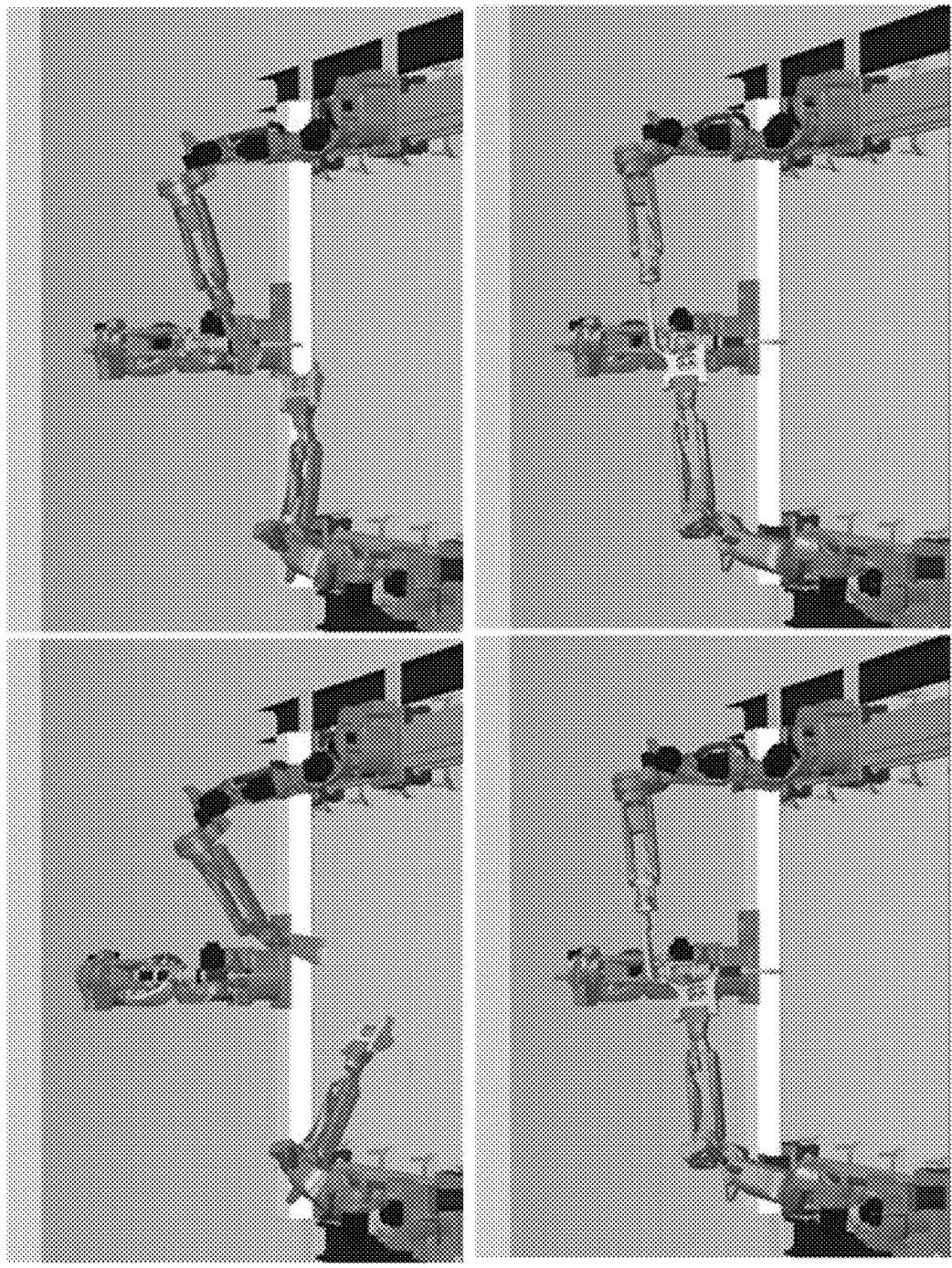
FIG. 14 is a graphical user interface of a natural tasking robotic system in a welding application, according to an embodiment of the present disclosure.
Figure 15:
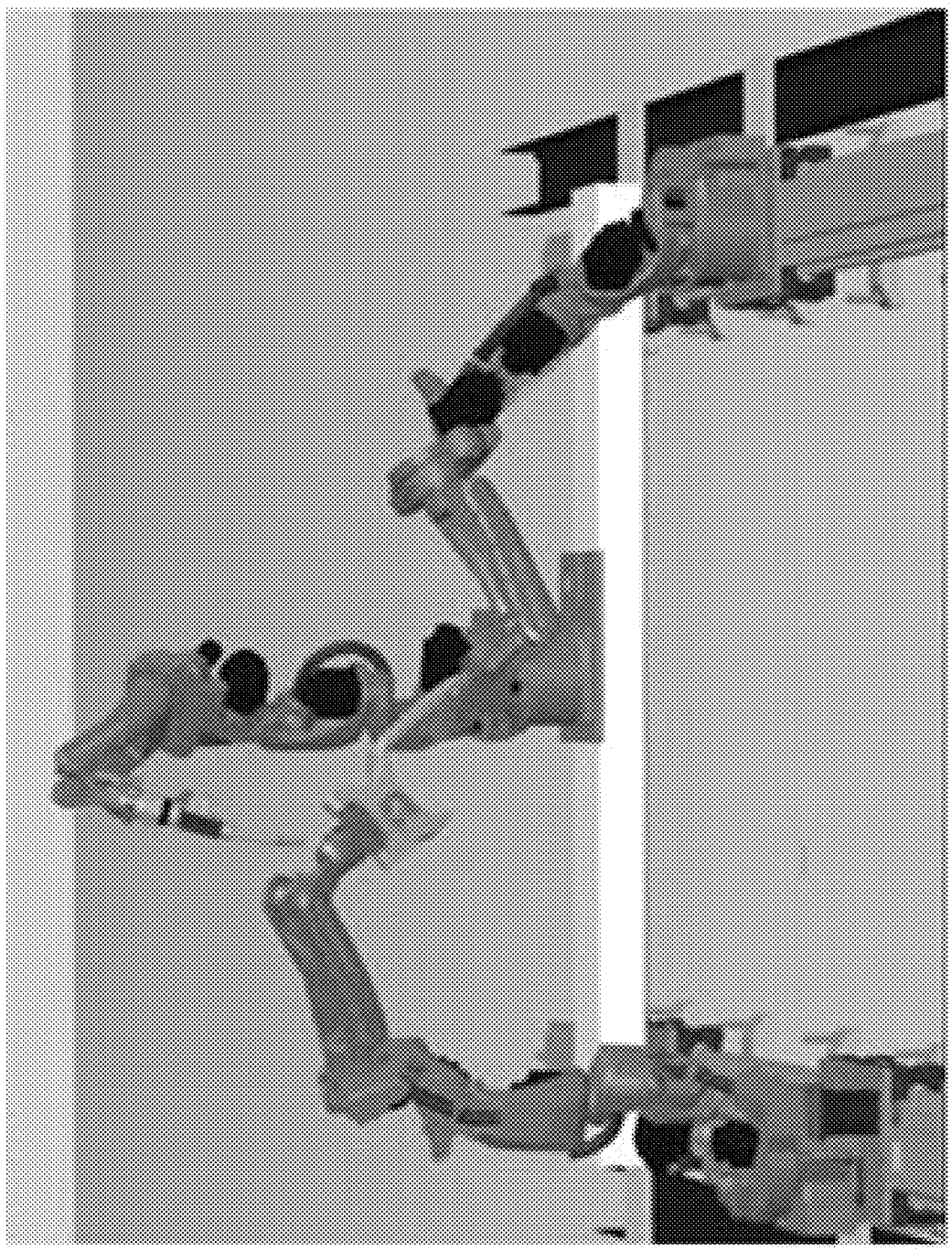
FIG. 15 is a graphical user interface of a natural tasking robotic system in a welding application, according to an embodiment of the present disclosure.
Figure 16:
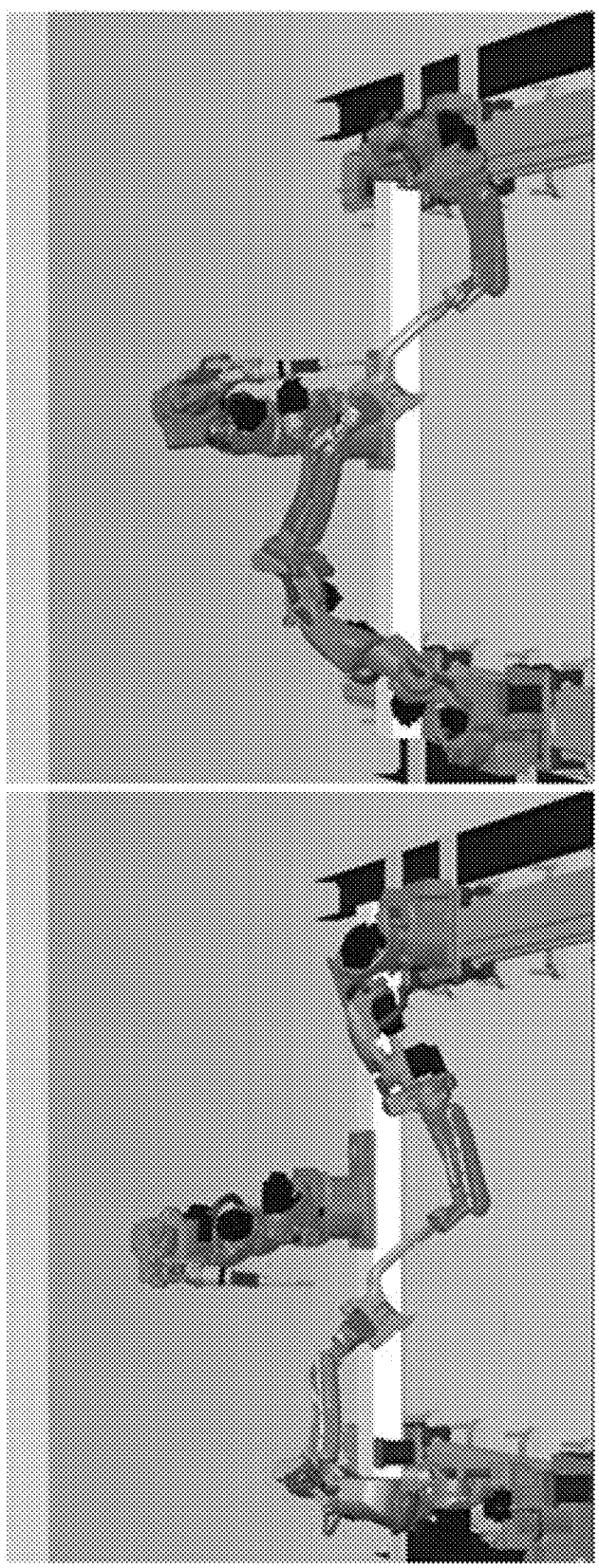
FIG. 16 is a graphical user interface of a natural tasking robotic system in a welding application, according to an embodiment of the present disclosure.
Figure 17:
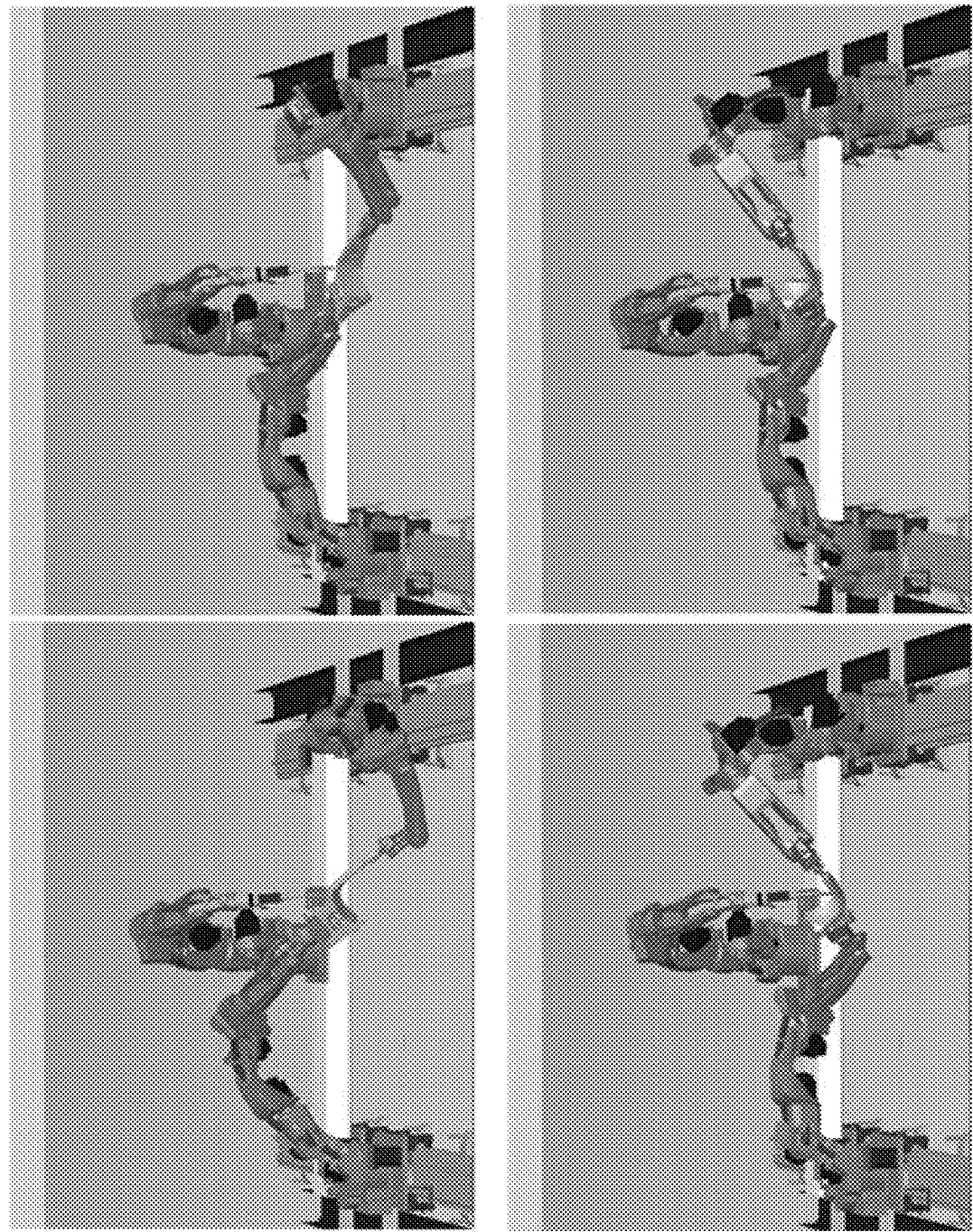
FIG. 17 is a graphical user interface of a natural tasking robotic system in a welding application, according to an embodiment of the present disclosure.
Figure 18:
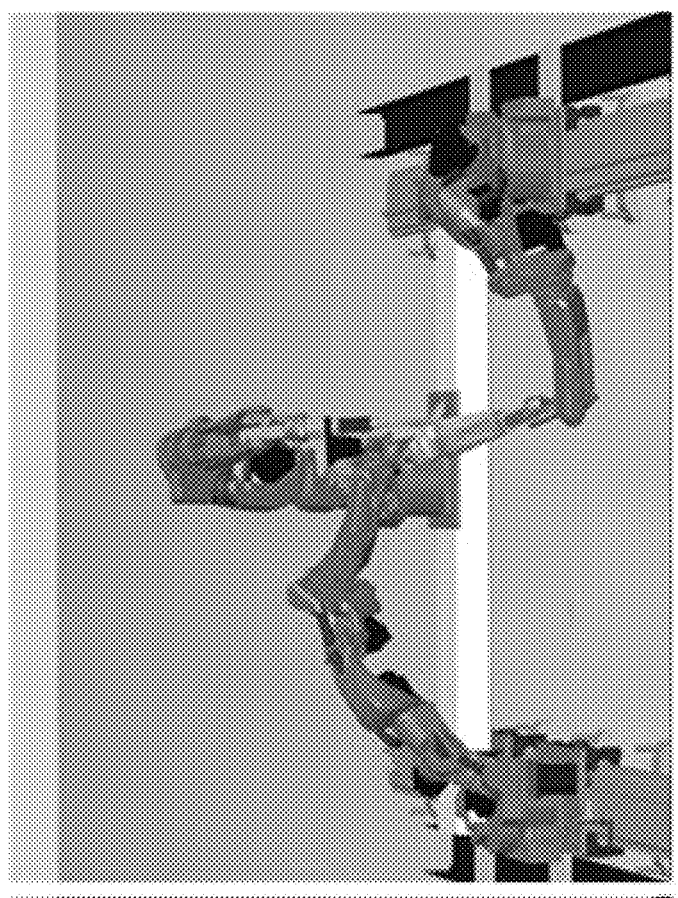
FIG. 18 is a graphical user interface of a natural tasking robotic system in a welding application, according to an embodiment of the present disclosure.
Figure 18:
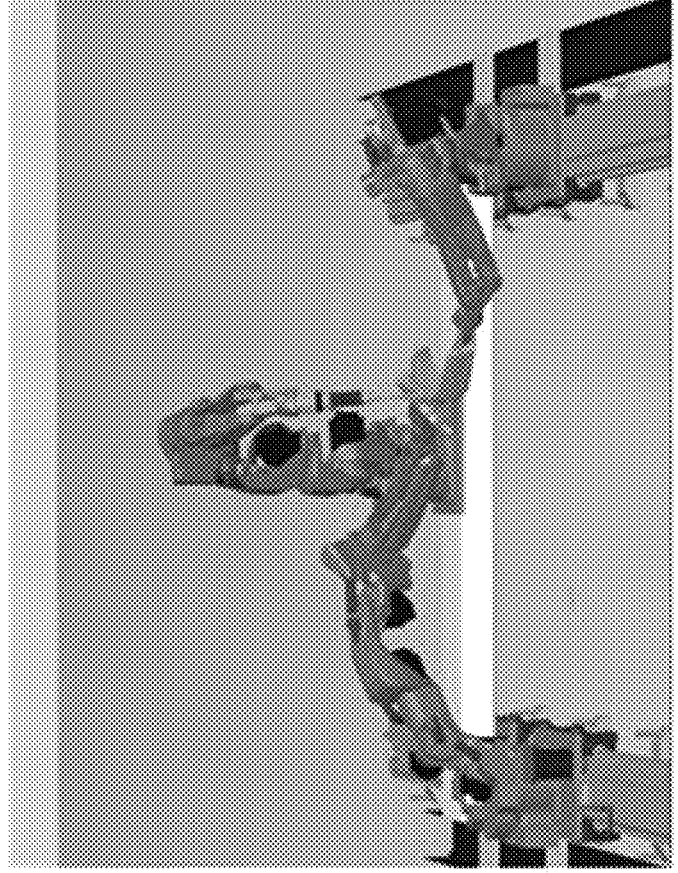
Figure 19:
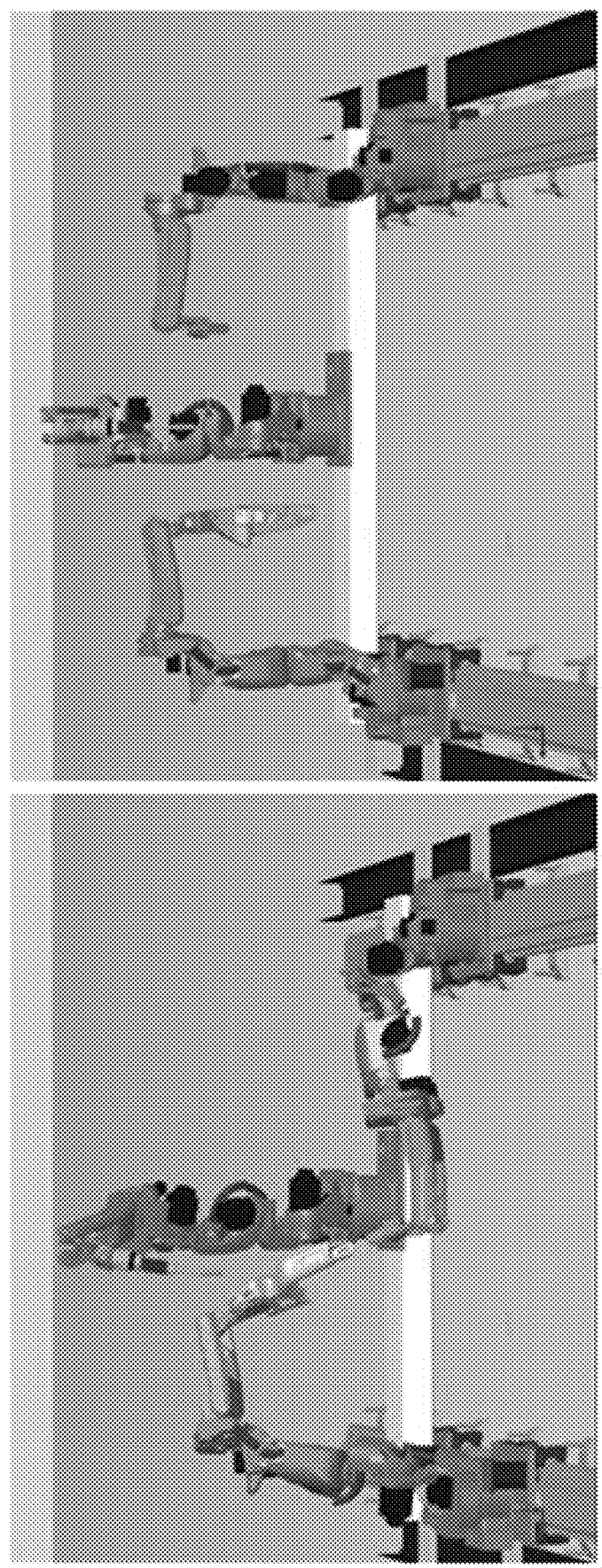
FIG. 19 is a graphical user interface of a natural tasking robotic system in a welding application, according to an embodiment of the present disclosure.

In operation, and as shown in FIG. 13, the system may be configured to constrain the grippers relative to the parts they intend to grasp. No matter where in the workspace the parts are, the script commands them relative to their location. FIG. 14 shows an example where two parts may be mated together. This may involve setting the tool offset on one arm to the mating coordinate of the part its holding, and setting the goal to be the mating coordinate of the other part, which may be held by the other arm. The arms may be constrained relative to each other, so there is no specific location in the system frame where these parts will be mated.

Referring now to FIGS. 15-19, in this particular example, the third arm may move the welder into position relative the assembly which may be held by the other two arms. Again, the position of the assembly in the workspace may not be constrained, only the weld gun may be constrained relative to the assembly, and its roll and pitch may be constrained in system. The welder may move along the path and the other two arms may automatically manipulate the part to achieve the path motion. It should be noted that the assembly appears to travel randomly around the workspace. After the path is complete, one gripper may retract relative to the assembly, again unconstrained in the system frame. Then move to a nominal system positon. This example shows how minimal constraints are specified in their natural reference frame, and may be used to complete a very complex motion coordinated between three arms.

Referring now to FIGS. 20-23, embodiments of a natural tasking robotic system as applied to a robotic assembly process are provided. In this particular example, positioning a part in an assembly task may not require a full 6-DOF depending on the geometry of the parts. This particular example shows positioning an axle through a wheel and a carriage. In this example, the arm holding the axle bolt may be free to rotate about the axle bolt axis, and the arm holding the wheel is also free to rotate about the wheel axis (e.g. Y-axis).

Figure 20:
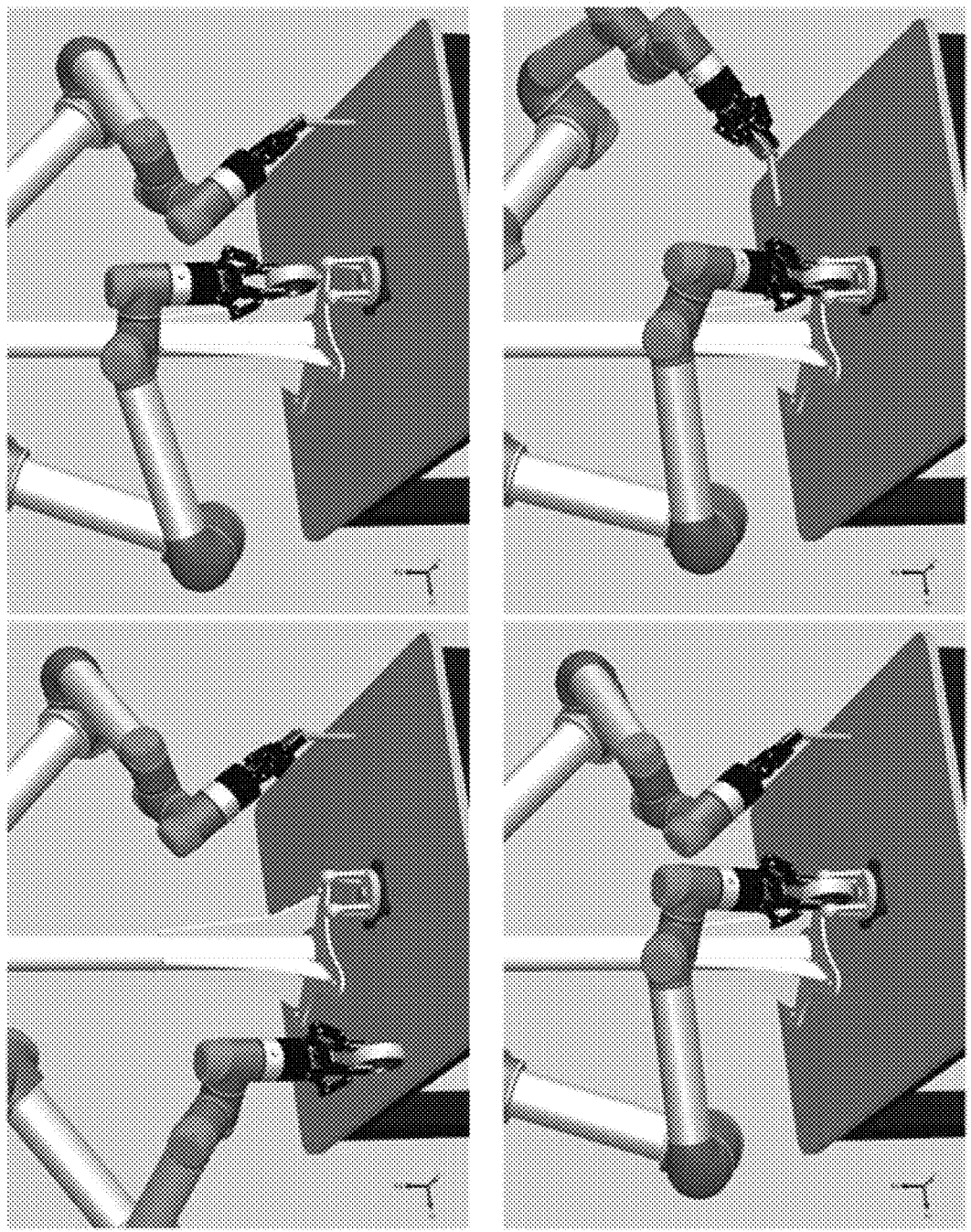
FIG. 20 is a graphical user interface of a natural tasking robotic system in a robotic assembly application, according to an embodiment of the present disclosure.
Figure 21:
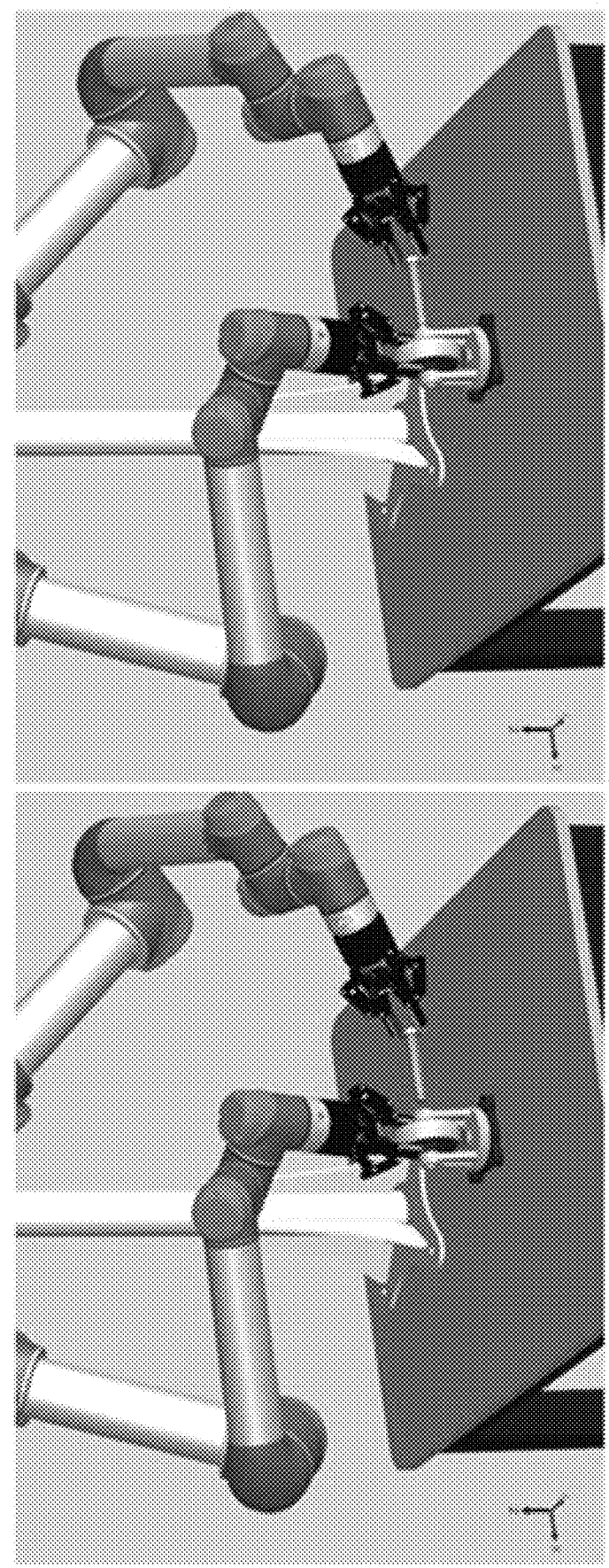
FIG. 21 is a graphical user interface of a natural tasking robotic system in a robotic assembly application, according to an embodiment of the present disclosure.
Figure 22:
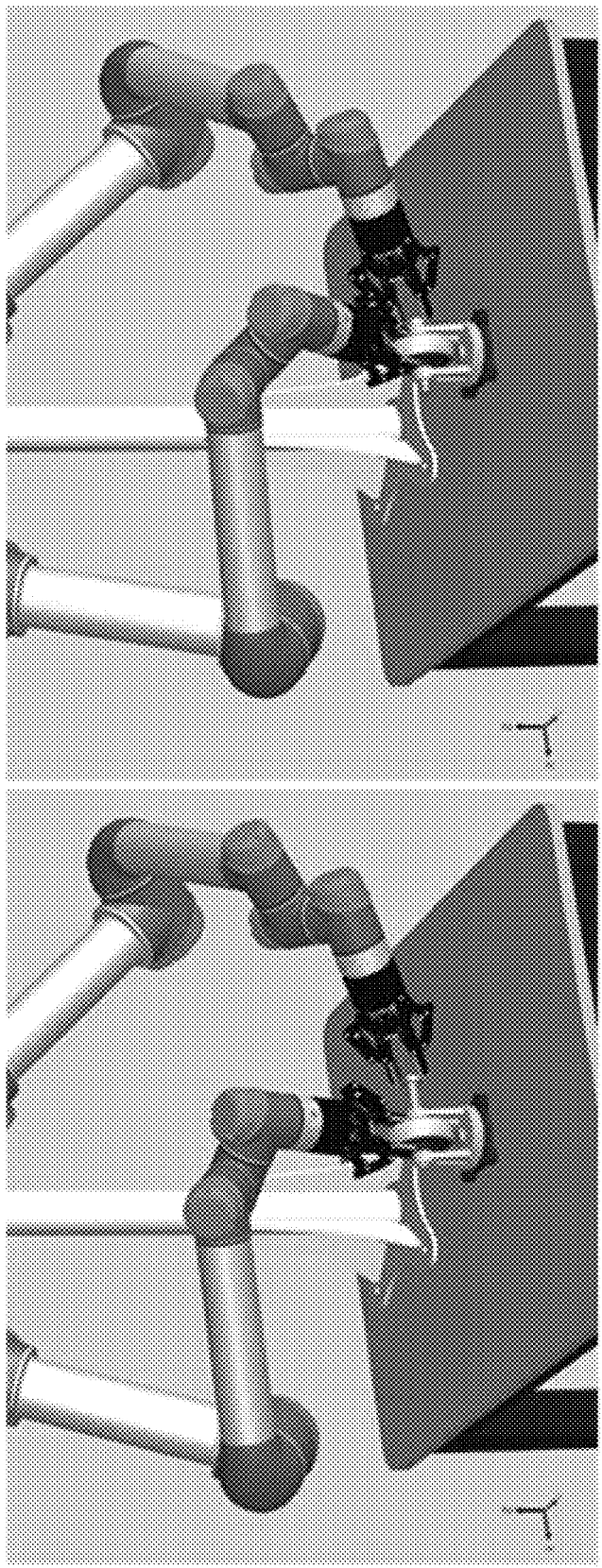
FIG. 22 is a graphical user interface of a natural tasking robotic system in a robotic assembly application, according to an embodiment of the present disclosure.
Figure 23:
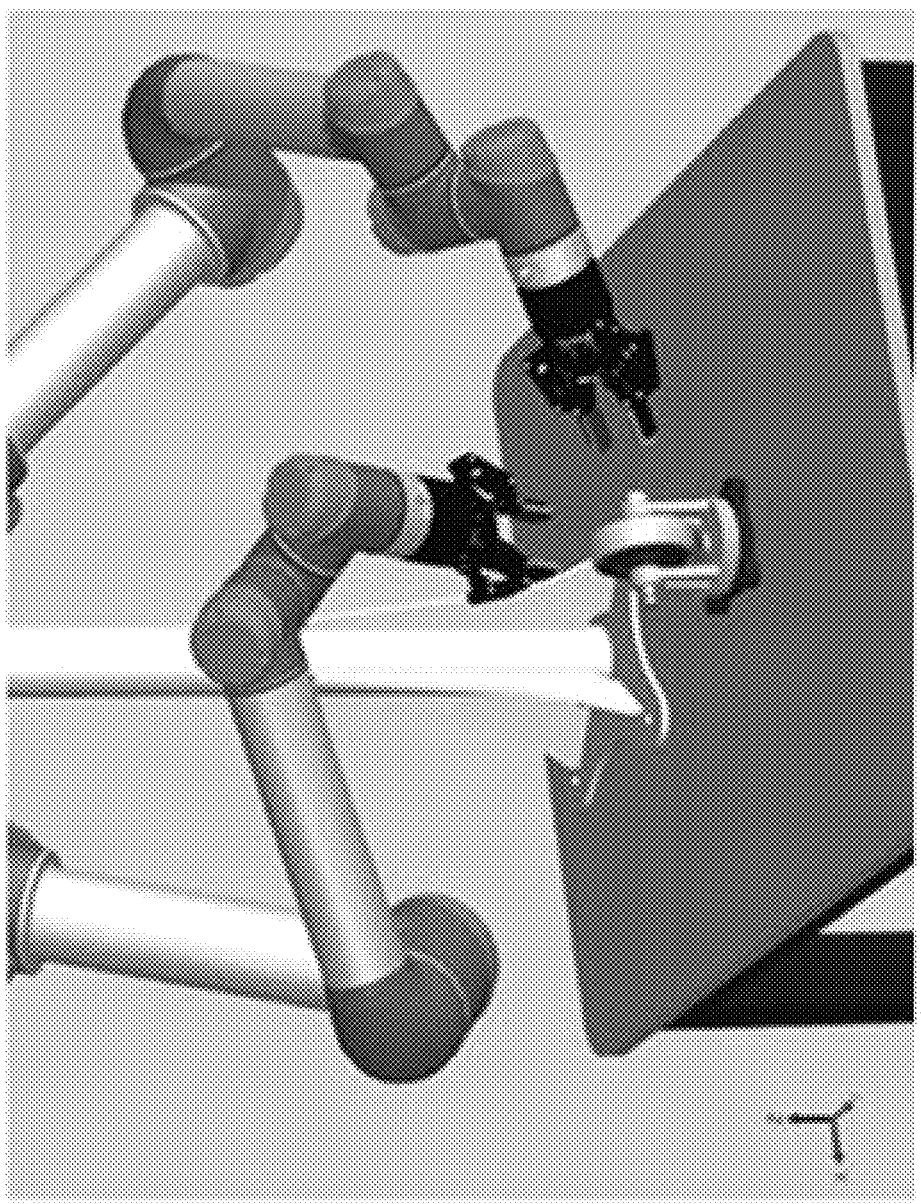
FIG. 23 is a graphical user interface of a natural tasking robotic system in a robotic assembly application, according to an embodiment of the present disclosure.

As is shown in FIG. 20, the first step in the process of inserting the axle, may include grasping the parts and then setting the tool offset to the relevant coordinates. In this particular example, for one arm is the center of the wheel, and the other is the center of the axle. The wheel may then be positioned relative to the housing. At this point the arm holding the wheel may be free to rotate about the wheel axis, and the arm holing the axle is free to rotate about the axle axis. As shown in FIGS. 21-22, the next step is insertion, which may involve commanding the hand to move the pin into position with its current constraints. As the axle is inserted, the arm holding the wheel may be free to rotate about its axis and avoid collision with the other arm. As shown in FIG. 23, the last step may include releasing and retracting relative to the parts being manipulated. This example shows how minimal constraints may be specified in their natural reference frame, and how they may be used to complete an assembly motion coordinated between two robot arms.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a circuit," "module" or "system." Furthermore, aspects of the present disclosure may take the orm of a computer program product embodied in one or more computer readable medium(s) aving computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable readonly memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave.

Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may, but not always, represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A system comprising:
   a robotic system having a maximum number of degrees of freedom associated therewith, wherein the maximum number of degrees of freedom corresponds to a maximum number of modes in which the robotic system can move;
   a graphical user interface configured to receive a natural robot task having at least one natural workpiece constraint associated with the natural robot task, wherein the natural robot task includes a task that is performed using a reduced amount of motion;
   a scanner configured to automatically scan an entire workpiece; and
   a processor configured to identify a minimum number of degrees of freedom required to perform the natural robot task, wherein the minimum number of degrees of freedom is based upon, at least in part, the scanned workpiece and the at least one natural workpiece constraint associated with the natural robot task, wherein the minimum number of degrees of freedom is a minimum number of modes in which the robotic system can move to perform the natural robot task, wherein the processor determines how to perform the natural robot task automatically.

2. The system of claim 1, wherein the at least one natural workpiece constraint associated with the natural robot task is selected from a group consisting of directional constraints, assignment to a curve or surface, distance constraints, joint positions, linear and nonlinear functional combinations of joint positions, workpiece geometry, workpiece features, center of mass, and linear and angular momentum.

3. The system of claim 1, further comprising:
a scanner configured to identify the at least one natural workpiece constraint associated with the natural robot task.

4. The system of claim 3, wherein the at least one natural workpiece constraint associated with the natural robot task or the identification of a minimum number of degrees of freedom is determined automatically, in response to the scanner identification.

5. The system of claim 1, further comprising:
a simulator configured to determine a feasible or an optimized implementation of the natural robot task.

6. The system of claim 1, wherein receiving the natural robot task is received in conjunction with a learning demonstration.

7. The system of claim 1, wherein the minimum number of degrees of freedom is less than the maximum number of degrees of freedom.

8. The system of claim 1, wherein the at least one natural workpiece constraint associated with the natural robot task or the identification of a minimum number of degrees of freedom is specified by a user.

9. The system of claim 1, wherein the at least one natural workpiece constraint associated with the natural robot task or the identification of a minimum number of degrees of freedom is updated in real-time during an operation of the robotic system.

10. The system of claim 1, wherein the minimum number of degrees of freedom is based upon, at least in part, sensor data.

11. The system of claim 1, wherein the at least one natural workpiece constraint associated with the natural robot task or the identification of a minimum number of degrees of freedom is updated using a communication channel before, during, or after an operation of the robotic system.

12. The system of claim 1, wherein the graphical user interface is at least one of a two-dimensional interface or a three-dimensional interface.

13. The system of claim 1, wherein the natural robot task is received by the system without referencing a robotic system frame used to control the robotic system.

14. The system of claim 1, wherein the minimum number of degrees of freedom is identified by referencing only one or more features and a geometry of a workpiece.

15. The system of claim 1, wherein the processor is configured to control the robotic system to perform the natural robot task by exploring an extra degree of freedom, wherein the extra degree of freedom is based upon, at least in part, a different between the maximum number of degrees of freedom and the minimum number of degrees of freedom.

16. The system of claim 15, wherein exploring the extra degree of freedom includes optimizing a criteria using the extra degrees of freedom to solve a gradient-based problem that seeks to minimize the criteria.

17. The system of claim 1, wherein the processor and scanner are configured to define a workspace prior to performing a robotic task.

18. The system of claim 17, wherein the at least one natural environmental constraint includes a peg-in-hole insertion, line following, camera pointing, grasping a symmetrical object, placing an object on a flat surface, contacting a flat object with a suction cup, steering a mobile base, or controlling the center of mass of a mobile robot to product stability.

19. The system of claim 1, wherein the natural robot task includes at least one natural environmental constraint associated with the natural robot task.

20. The system of claim 1, wherein the at least one natural workpiece constraint includes one or more geometrical features associated with a particular workpiece.

21. The system of claim 1, wherein the processor is configured to control the robotic system to perform the natural robot task by exploring relaxing a degree of freedom.

22. A robotic method comprising:
providing a robotic system having a maximum number of degrees of freedom associated therewith, wherein the maximum number of degrees of freedom corresponds to a maximum number of modes in which the robotic system can move;
receiving, at a graphical user interface, a natural robot task having at least one natural workpiece constraint associated with the natural robot task, wherein the natural robot task includes a task that is performed using a reduced amount of motion; and
automatically scanning an entire workpiece; and
identifying, using at least one processor, a minimum number of degrees of freedom required to perform the natural robot task, wherein the minimum number of degrees of freedom is based upon, at least in part, the scanned workpiece and the at least one natural workpiece constraint associated with the natural robot task, wherein the minimum number of degrees of freedom is a minimum number of modes in which the robotic system can move to perform the natural robot task, wherein the processor determines how to perform the natural robot task automatically.

23. The robotic method of claim 22, wherein the at least one natural workpiece constraint associated with the natural robot task is selected from a group consisting of directional constraints, assignment to a curve or surface, distance constraints, joint positions, linear and nonlinear functional combinations of joint positions, workpiece geometry, workpiece features, center of mass, and linear and angular momentum.

24. The robotic method of claim 22, further comprising:
identifying, based upon, at least in part, a scanner, the at least one natural workpiece constraint associated with the natural robot task.

25. The robotic method of claim 24, wherein the at least one natural workpiece constraint associated with the natural robot task or the identification of a minimum number of degrees of freedom is determined automatically, in response to the scanner identification.

26. The robotic method of claim 22, further comprising:
determining, based upon, at least in part, a simulation, a feasible or an optimized implementation of the natural robot task.

27. The robotic method of claim 22, wherein receiving the natural robot task is received in conjunction with a learning demonstration.

28. The robotic method of claim 22, wherein the minimum number of degrees of freedom is less than the maximum number of degrees of freedom.

29. The robotic method of claim 22, wherein the at least one natural workpiece constraint associated with the natural robot task or the identification of a minimum number of degrees of freedom is specified by a user.

30. The robotic method of claim 22, wherein the at least one natural workpiece constraint associated with the natural robot task or the identification of a minimum number of degrees of freedom is updated in real-time during an operation of the robotic system.

31. The robotic method of claim 22, wherein the minimum number of degrees of freedom is based upon, at least in part, sensor data.

32. The robotic method of claim 22, wherein the at least one natural workpiece constraint associated with the natural robot task or the identification of a minimum number of degrees of freedom is updated using a communication channel before, during, or after an operation of the robotic system.

33. The robotic method of claim 22, wherein the graphical user interface is at least one of a two-dimensional interface or a three-dimensional interface.

34. The robotic method of claim 22, wherein the minimum number of degrees of freedom is identified without referencing a robotic method frame used to control the robotic system.

35. The robotic method of claim 22, wherein the minimum number of degrees of freedom is identified by referencing only one or more features and a geometry of a workpiece.

36. The robotic method of claim 22, further comprising:
controlling, using the at least one processor, the robotic system to perform the natural robot task by exploring an extra degree of freedom, wherein the extra degree of freedom is based upon, at least in part, a difference between the maximum number of degrees of freedom and the minimum number of degrees of freedom.

37. The robotic method of claim 22, further comprising:
defining a workspace prior to performing a robotic task wherein defining is based upon, at least in part, data from the processor and the scanner.

38. The robotic method of claim 22, wherein the natural robot task includes at least one natural environmental constraint associated with the natural robot task.

39. The robotic method of claim 38, wherein the at least one natural environmental constraint includes a peg-in-hole insertion, line following, camera pointing, grasping a symmetrical object, placing an object on a flat surface, contacting a flat object with a suction cup, steering a mobile base, or controlling the center of mass of a mobile robot to product stability.

40. The robotic method of claim 22, wherein the at least one natural workpiece constraint includes geometrical features associated with a particular workpiece.

41. The robotic method of claim 22, wherein the at least one natural workpiece constraints is of the less-than-or-equal-to type rather than the equal-to type.

42. The robotic method of claim 22, wherein a manipulator Jacobian is used, at least in part, to calculate motion associated with the robotic system.

* * * * *